United States Patent
Mahmoudzadeh et al.

(10) Patent No.: US 12,382,176 B2
(45) Date of Patent: Aug. 5, 2025

(54) FIVE-AXIS SENSOR SHIFT CAMERA MODULE

(71) Applicant: Apple Inc., Cupertino, CA (US)

(72) Inventors: Seyed Mohammad Javid Mahmoudzadeh, San Jose, CA (US); Aurelien R Hubert, San Jose, CA (US)

(73) Assignee: Apple Inc., Cupertino, CA (US)

( * ) Notice: Subject to any disclaimer, the term of this patent is extended or adjusted under 35 U.S.C. 154(b) by 161 days.

(21) Appl. No.: 18/461,367

(22) Filed: Sep. 5, 2023

(65) Prior Publication Data
US 2024/0107167 A1    Mar. 28, 2024

Related U.S. Application Data

(60) Provisional application No. 63/376,757, filed on Sep. 22, 2022.

(51) Int. Cl.
| | |
|---|---|
| H04N 23/68 | (2023.01) |
| H04N 23/54 | (2023.01) |
| H04N 23/55 | (2023.01) |
| H04N 23/67 | (2023.01) |

(52) U.S. Cl.
CPC ........... *H04N 23/687* (2023.01); *H04N 23/54* (2023.01); *H04N 23/55* (2023.01); *H04N 23/67* (2023.01)

(58) Field of Classification Search
CPC ...... H04N 23/687; H04N 23/54; H04N 23/55; H04N 23/67; H04N 23/57; H04N 23/6812; H02K 41/0356
See application file for complete search history.

(56) References Cited

U.S. PATENT DOCUMENTS

| | | | |
|---|---|---|---|
| 7,612,953 | B2 | 11/2009 | Nagai et al. |
| 8,248,497 | B2 | 8/2012 | Tanimura et al. |
| 9,298,017 | B2 | 3/2016 | Sugawara et al. |
| (Continued) | | | |

FOREIGN PATENT DOCUMENTS

| | | |
|---|---|---|
| CN | 101808191 | 8/2010 |
| CN | 102749697 | 10/2012 |
| (Continued) | | |

OTHER PUBLICATIONS

U.S. Appl. No. 18/353,805, filed Jul. 17, 2023, Shashank Sharma, et al.

*Primary Examiner* — Padma Haliyur
(74) *Attorney, Agent, or Firm* — Robert C. Kowert; Kowert, Hood, Munyon, Rankin & Goetzel, P.C.

(57) ABSTRACT

An actuator assembly for a camera module is provided. The actuator assembly includes a transversal actuator for motion of an image sensor of the camera module in one or more directions orthogonal to an optical axis of the camera module. The actuator assembly also includes an axial actuator for motion of the image sensor in one or more directions parallel to the optical axis of the camera module. The actuator assembly further includes a carrier retaining a portion of the transversal actuator and a portion of the axial actuator. The carrier moves with the image sensor in the one or more directions orthogonal to the optical axis of the camera module and is static relative to motion of the image sensor in the one or more directions parallel to the optical axis of the camera module.

20 Claims, 17 Drawing Sheets

(56) References Cited

U.S. PATENT DOCUMENTS

| | | |
|---|---|---|
| 9,632,280 B2 | 4/2017 | Yeo |
| 9,773,169 B1 | 9/2017 | Fulmer |
| 10,863,094 B2 | 12/2020 | Sharma et al. |
| 11,223,766 B2 | 1/2022 | Sharma et al. |
| 11,575,835 B2 | 2/2023 | Xu et al. |
| 11,750,929 B2 | 9/2023 | Sharma et al. |
| 2010/0165131 A1 | 7/2010 | Makimoto et al. |
| 2012/0268642 A1 | 10/2012 | Kawai |
| 2014/0009631 A1* | 1/2014 | Topliss ............... H04N 23/687 348/208.11 |
| 2014/0255016 A1 | 9/2014 | Kim et al. |
| 2016/0070115 A1 | 3/2016 | Miller |
| 2016/0072998 A1 | 3/2016 | Yazawa |
| 2016/0154204 A1 | 6/2016 | Lim et al. |
| 2016/0209672 A1 | 7/2016 | Park et al. |
| 2017/0082829 A1 | 3/2017 | Kudo et al. |
| 2017/0155816 A1 | 6/2017 | Ito et al. |
| 2017/0285362 A1 | 10/2017 | Hu et al. |
| 2018/0041668 A1 | 2/2018 | Cui |
| 2018/0171991 A1 | 6/2018 | Miller et al. |
| 2018/0173080 A1 | 6/2018 | Enta |
| 2019/0020822 A1* | 1/2019 | Sharma ............... G02B 27/646 |
| 2019/0141248 A1* | 5/2019 | Hubert ................. H05K 1/189 |
| 2021/0132327 A1* | 5/2021 | Sharma .................. G02B 7/09 |
| 2021/0223563 A1 | 7/2021 | Miller |
| 2021/0318593 A1* | 10/2021 | Sharma .................. H04N 23/55 |
| 2021/0409604 A1* | 12/2021 | Sharma ................ H04N 23/687 |
| 2022/0103744 A1* | 3/2022 | Hsu ....................... G03B 13/36 |
| 2022/0247931 A1* | 8/2022 | Mahmoudzadeh ......................... H02K 41/0356 |
| 2023/0188852 A1 | 6/2023 | Xu et al. |
| 2024/0214684 A1* | 6/2024 | Mahmoudzadeh .... G03B 13/36 |

FOREIGN PATENT DOCUMENTS

| | | |
|---|---|---|
| CN | 104767915 | 7/2015 |
| CN | 105573014 | 5/2016 |
| CN | 105652557 | 6/2016 |
| CN | 105807537 | 7/2016 |
| CN | 106291862 | 1/2017 |
| CN | 106470303 | 3/2017 |
| CN | 207573455 | 7/2018 |
| CN | 109155816 | 1/2019 |
| CN | 111567029 | 8/2020 |
| JP | 2011154403 | 8/2011 |
| JP | 2016028299 | 2/2016 |
| KR | 20150051097 | 5/2015 |

\* cited by examiner

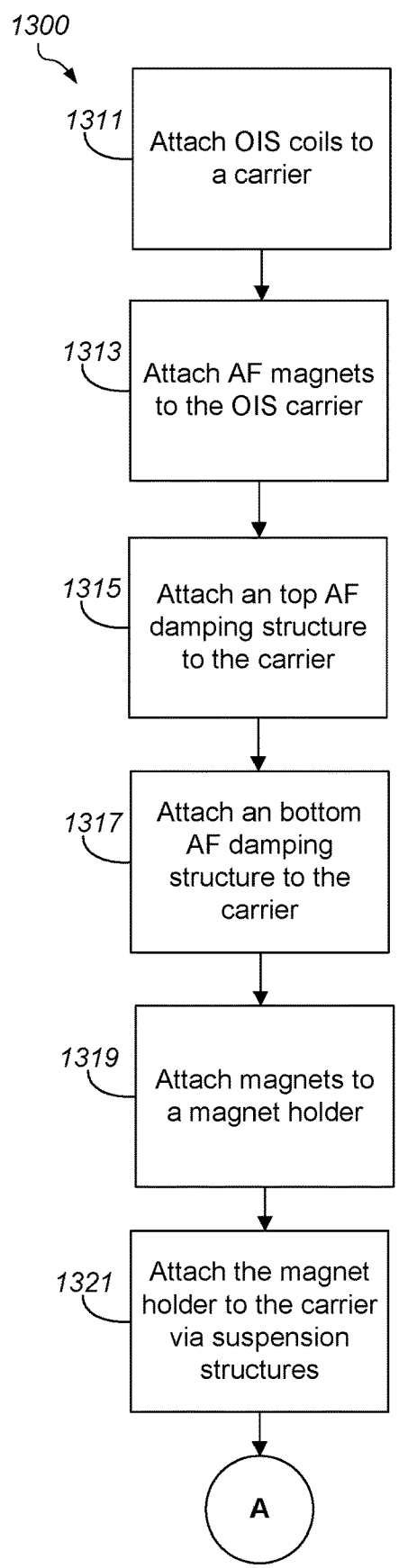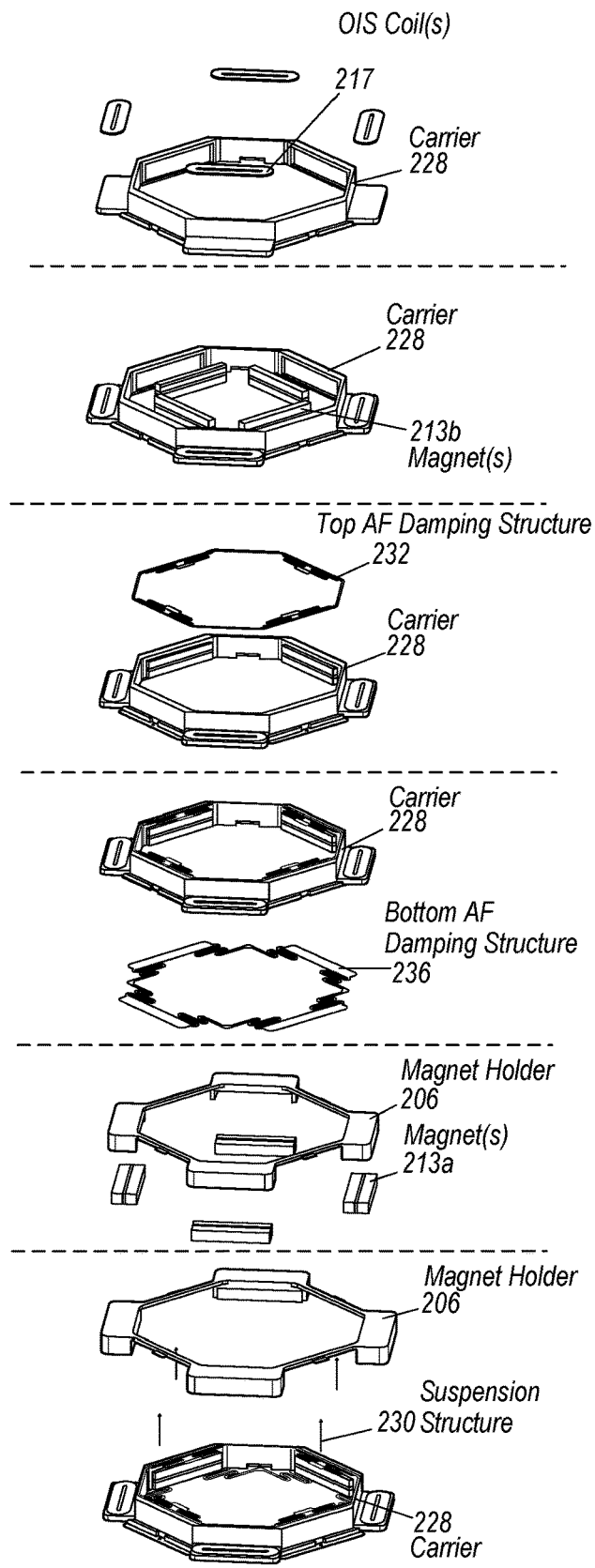
FIG. 13B

FIVE-AXIS SENSOR SHIFT CAMERA MODULE

PRIORITY APPLICATION

This application claims benefit of priority to U.S. Provisional Application Ser. No. 63/376,757, entitled "Five-Axis Sensor Shift Camera Module," filed Sep. 22, 2022, and which is hereby incorporated herein by reference in its entirety.

BACKGROUND

Technical Field

This disclosure relates generally to a sensor shift camera module for actuation on five axes.

Description of the Related Art

The advent of small, mobile multipurpose devices such as smartphones and tablet or pad devices has resulted in a need for high-resolution, small form factor cameras for integration in the devices. Some cameras may incorporate optical image stabilization (OIS) mechanisms that may sense and react to external excitation/disturbance by adjusting location of the optical lens and/or the image sensor on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens and/or the image sensor is moved as a single rigid body along the optical axis of the camera to refocus the camera.

BRIEF DESCRIPTION OF THE DRAWINGS

FIG. 1 shows an overhead view of the exterior of the camera. FIG. 2 shows a cross-sectional view of the camera.

FIG. 3 shows an overhead perspective view of the exterior of the camera. FIG. 4 shows a cross-sectional view of the camera across the A-A plane. FIG. 5 shows a cross-sectional view of the camera across the B-B plane.

FIG. 9 shows a cross-sectional view of the camera across the A-A plane with no image sensor tilt. FIG. 10 shows a cross-sectional view of the camera across the A-A plane with image sensor tilt in a first direction. FIG. 4 shows a cross-sectional view of the camera across the A-A plane with image sensor tilt in a second direction.

FIG. 13B illustrates steps for a method for assembling a camera having an actuator module or assembly that may, for example, be used to provide autofocus and/or optical image stabilization through image sensor movement in small form factor cameras, according to at least some embodiments.

Figure 1:
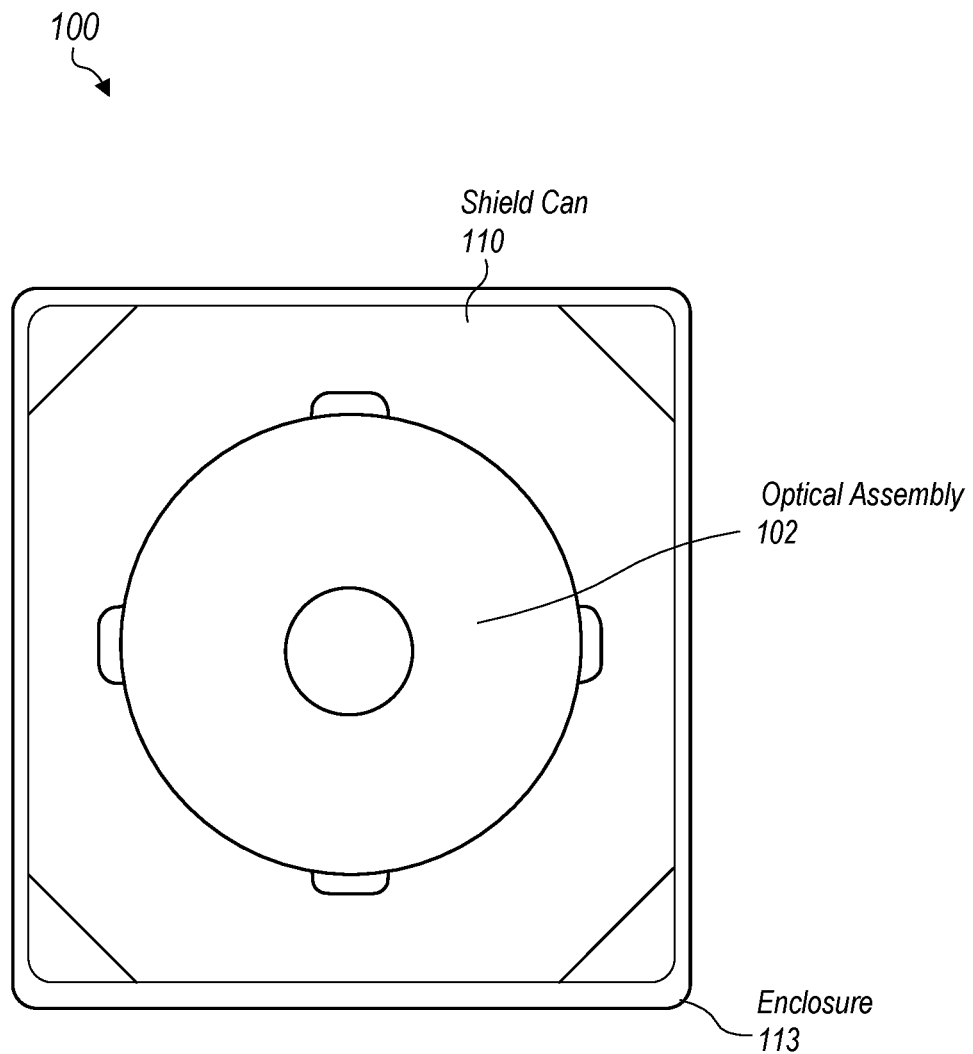
FIGS. 1 and 2 illustrate components of an example camera having an actuator module or assembly that may, for example, be used to provide autofocus and/or optical image stabilization through image sensor movement in small form factor cameras, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to an actuator assembly that may be used in a camera with a moveable image sensor. In some examples, the camera may include camera equipment outfitted with controls, magnets, flexures, and voice coil motors to improve the effectiveness of a miniature actuation mechanism for a compact camera module. More specifically, in some embodiments, compact camera modules include actuators to deliver functions such as autofocus (AF) and optical image stabilization (OIS). One approach to delivering a very compact actuator for OIS and AF is to use a Voice Coil Motor (VCM) arrangement.

In some embodiments, actuator assemblies may be used provide AF and/or OIS for a camera. In some aspects, an axial actuator may drive an optical assembly having one or more lenses in one or more directions parallel to an optical axis (e.g., z-direction(s)) to provide autofocus. A transversal actuator, separate from the axial actuator, may drive an optical assembly and/or an image sensor in one or more directions orthogonal to an optical axis (e.g., x-direction(s), y-direction(s)) to provide OIS. As described herein, an actuator assembly (hereinafter the "actuator assembly") may integrate an axial actuator and a transversal actuator to drive an image sensor in five different ranges of motion for AF, OIS, tilt about the x-direction (e.g., angular motion), and/or tilt about the y-direction (e.g., angular motion). The actuator assembly may include an axial actuator for motion of the image sensor in one or more directions parallel to an optical axis of the optical assembly (AF) and a transversal actuator for motion of the image sensor in one or more directions orthogonal to the optical axis of the optical assembly (OIS). The actuator assembly includes a carrier (e.g., a single carrier) that retains a portion of the axial actuator and a portion of the transversal actuator thereby integrating the axial actuator and the transversal actuator. For example, the portion of the axial actuator retained by the carrier may include one or more magnets and the portion of the transversal actuator retained by the carrier may include one or more coils. Another portion of the axial actuator may be retained by an AF carrier, fixedly coupled to the image sensor via the substrate, and may interact with the portion of the axial actuator retained by the carrier to move the image sensor in a direction parallel to the optical axis. In some aspects, the other portion of the axial actuator may include one or more coils. Another portion of the transversal actuator may be retained by a holder, fixedly attached to a shield can of the camera (e.g., a stationary structure of the camera), and may interact with the portion of the transversal actuator to move the image sensor in a direction orthogonal to the optical axis. In some aspects, the other portion of the transversal actuator may include one or more magnets. In some instances, magnets as described herein may include bi-pole magnets.

As described herein, the actuator assembly includes a carrier that retains a portion of the axial actuator and a portion of the transversal actuator. Another portion of the axial actuator may be retained by an AF carrier, fixedly coupled to the image sensor via the substrate, and may interact with the portion of the axial actuator retained by the carrier to move the image sensor in a direction parallel to the optical axis. Another portion of the transversal actuator may be retained by a holder, fixedly attached to a shield can of the camera (e.g., a stationary structure of the camera), and may interact with the portion of the transversal actuator to move the image sensor in a direction orthogonal to the optical axis. As described herein, the carrier may not be fixedly attached to the AF carrier and instead may be coupled to the AF carrier via one or more damping structures providing some independent movement between the carrier and the AF carrier. For example, top suspension springs and bottom suspension springs may couple the carrier to the AF carrier. The top suspension springs and the bottom suspension springs may permit the carrier to move with movement of the image sensor during OIS or transversal movement of the image sensor while allowing the carrier to remain static (e.g., reduce a bending moment on the carrier) during AF or axial movement of the image sensor and/or during a tilt movement of the image sensor. In some aspects, the carrier may be coupled to the holder via one or more suspension structures. The suspension structures may couple the carrier to the holder (and thus a stationary structure of the camera) and may permit the carrier to move with movement of the image sensor during OIS or transversal movement of the image sensor while preventing the carrier from axial movement during AF or axial movement of the image sensor and/or during a tilt movement of the image sensor. Thus, the carrier moves with the image sensor in one or more directions orthogonal to the optical axis (e.g., during OIS or transversal movement of the image sensor) and is static relative to the motion of the image sensor in one or more directions parallel to the optical axis (e.g., during AF movement of the image sensor and/or tilt movement of the image sensor).

As described further herein, the actuator assembly may include a plurality of transversal actuators and a plurality of axial actuators with a portion of the respective transversal actuators and a portion of the respective axial actuators retained by the carrier. In this case, the carrier may retain a portion of the plurality of respective axial actuators and a portion of the plurality of respective transversal actuators thereby integrating the plurality of axial actuators and the plurality of transversal actuators. For example, the portion of a first axial actuator of the plurality of axial actuators may be retained by the carrier and a portion of a second axial actuator of the plurality of axial actuators may also be retained by the carrier. Another portion of the first axial actuator of the plurality of axial actuators and another portion of the second axial actuator of the plurality of axial actuators may be retained by the AF carrier, fixedly coupled to the image sensor via the substrate, and may interact with the portion of the first axial actuator and the portion of the second axial actuator, respectively, to move the image sensor in a direction parallel to the optical axis and/or to tilt the image sensor about an axis orthogonal to the optical access.

In some aspects, the portion of a first transversal actuator of the plurality of transversal actuators may be retained by the carrier and a portion of a second transversal actuator of the plurality of transversal actuators may also be retained by the carrier. Another portion of the first transversal actuator of the plurality of transversal actuators and another portion of the second transversal actuator of the plurality of transversal actuators may be retained by the retained by the holder, fixedly attached to a stationary structure of the camera (e.g., the shield can of the camera), and may interact with the portion of the first transversal actuator and the portion of the second transversal actuator, respectively, to move the image sensor in a direction orthogonal to the optical axis. In some aspects, the plurality of axial actuators and the plurality of transversal actuators may be positioned in an alternating sequence surrounding the image sensor. As shown herein, the plurality of axial actuators may include four axial actuators and the plurality of transversal actuators may include four transversal actuators. The four axial actuators and the four transversal actuators may be positioned in an alternating sequence surrounding the image sensor and forming an octagonal shape. Due to the plurality of axial actuators and the plurality of transversal actuators, axial movement of the image sensor, transversal movement of the image sensor, and/or tilt movement of the image sensor may be performed at the sensor level, by individual axial actuators or individual transversal actuators, and/or by a combination of one or more axial actuators and/or one or transversal actuators. Further, alternating and offsetting positions of the axial actuators and the transversal actuators may minimize or reduce magnetic cross-talk between axial actuator magnets and transversal actuator magnets during transversal movement (e.g., x-direction motion, y-direction motion) of the image sensor. The actuator assembly architecture provided herein may allow for independent activation of the AF coils to allow for axial motion and tilt motion (e.g., angular motion) without interference with transversal motion or OIS motion. Transversal motion may shift the entire axial motion actuator structure regardless of which axial actuator of the plurality of axial actuators are activated.

An actuator assembly integrated with one or more axial actuators and one or more transversal actuators may provide enhanced image stabilization with complex transversal, axial, rotational, and tilt correction and may endow the camera with ability to compensate for user handshake in five axes and for dynamic tilt. The actuator assembly integrated with one or more axial actuators and one or more transversal actuators may provide posture compensation and may allow for improved coplanarity adjustment between the image sensor and the optical plane. While a dynamic optical assembly including AF may be used with the actuator assembly described herein, the actuator assembly may be alternatively used with a static optical assembly (e.g., fixed lenses) so that more complex lens designs and additional variable aperture mechanisms may be implemented in a camera module. In some cases, implementing a static optical assembly enabled by the actuator assembly may omit a lens active-alignment step during model assembly. In addition, the angular compensation provided by the plurality of axial actuators and the plurality of transversal actuators may assist with reducing and/or cancelling module manufacturing residual tilt. In some aspects, the actuator assembly may have a higher frequency at a principal mode, and therefore has a higher bandwidth in disturbance rejection. The actuator assembly may provide no or reduced secondary image sensor motion (e.g., in the z-direction) due to at least one of the suspension assembly or the top and bottom suspension springs. The actuator assembly may provide no increase in shoulder height (e.g., of the shield can) compared to other camera module designs.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 2:
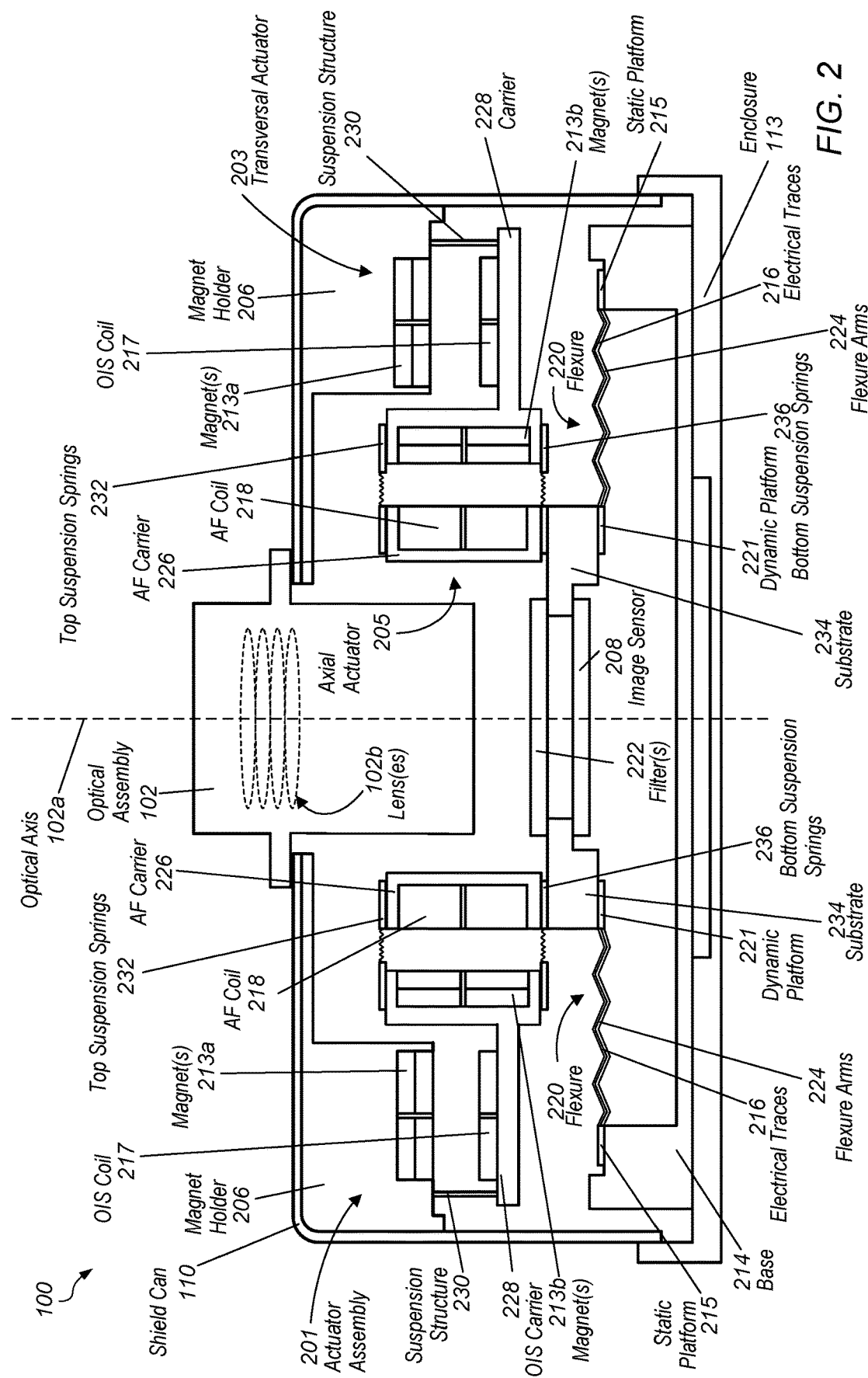

FIGS. 1 and 2 illustrate components of an example camera 100 having an actuator module or assembly that may, for example, be used to provide autofocus and/or optical image stabilization through image sensor movement in small form factor cameras, according to at least some embodiments. FIG. 1 shows an overhead view of the exterior of the camera 100. FIG. 2 shows a cross-sectional view of the camera 100. The camera 100 may include one or more same or similar features as the features described with respect to or illustrated in FIGS. 3, 4, 5, 6, 7, 8, 9, 10, 11, 12, 13A, 13B, 13C, 14, and 15. The example X-Y-Z coordinate system shown in FIGS. 1 and 2 is used to discuss aspects of components and/or systems, and may apply to embodiments described throughout this disclosure.

In various embodiments, the camera 100 may include an optical assembly 102 having one or more lenses 102*b* defining an optical axis 102*a*, a flexure 220, an actuator assembly 201, a shield can 110, a substrate 234 (e.g., an OIS FPC, printed circuit board, and/or the like), filter(s) 222, an image sensor 208, a base 114, and an enclosure 113. The flexure 220 may be connected to a bottom surface of the base 114. In some examples, the base 114 may define one or more recesses and/or openings having multiple different cross-sections. For instance, a lower portion of the base 114 and/or an upper portion of the base 114 may define a recess and/or an opening with a cross-section sized to receive the flexure 220. The shield can 110 may be mechanically attached to the base 114. The shield can 110 may be mechanically coupled to the base 114 via the enclosure 113 attached to both the shield can 110 and the base 114.

The flexure 220 may include a dynamic platform 221, a static platform 215, and a plurality of flexure arms 224. The plurality of flexure arms 224 may provide a flexible mechanical coupling between the static platform 215 and the dynamic platform 221. For example, the flexure arms 224 may allow the dynamic platform 221 to move in one or more directions orthogonal to the optical axis 102*a* relative to the static platform 215 (e.g., a remainder of the camera 100) using one or more transversal actuators 203 and may allow the dynamic platform 221 to move in one or more directions parallel to or along the optical axis 102*a* relative to the static platform 215 (e.g., a remainder of the camera 100) using one or more axial actuators 205. Additionally, the flexure arms 224 may allow the dynamic platform 221 to move in one or more angular directions about one or more axes orthogonal to the optical axis 102*a* relative to the static platform 215 (e.g., a remainder of the camera 100) using one or more axial actuators 205. In some aspects, the flexure arms 224 may include electrical traces 216 for communicating electrical power and electrical signals between the dynamic platform 221 (e.g., one or more electronic components (e.g., electronic components 239) mounted on the substrate 234, the image sensor 208 mounted on the substrate 234, one or more electronic components mounted to the dynamic platform 221, or the like) and the static platform 215. The static platform 215 may be in electrical communication with one or more other components of the camera 100, via an electrical connection, for performing one or more camera operations.

In some non-limiting examples, the image sensor 208 may be attached to or otherwise integrated into the substrate 234, such that the image sensor 208 is connected to the OIS frame or flexure 220 via the substrate 234. For example, the dynamic platform 221 may retain the substrate 234 for mounting one or more electronic components 239 and/or the image sensor 208. The substrate 234 may include an opening with a cross-section sized to permit light to pass therethrough while also receiving or retaining the filter(s) 222 and the image sensor 208. An upper surface of a top layer of the substrate 234 may retain the filter(s) 222 around a perimeter of the opening and a lower surface of a lower layer of the substrate 234 may retain the image sensor 208 around the perimeter of the opening. In some aspects, a ceramic layer beneath the lower layer of the substrate 234 may couple the image sensor 208 to the substrate 234. In some aspects, the lower layer of the substrate 234 may include a ceramic material that may couple the image sensor 208 to the substrate 234. With the lower surface of the lower layer of the substrate 234 retaining the image sensor 208 around the perimeter of the opening, the image sensor 208 may be connected (e.g., mechanically and/or electrically) to the flexure 220 via the substrate 234. This configuration may allow the substrate 234 to retain the image sensor 208 (and the filter(s) 222) while also allowing light to pass from the lens(es) of the optics assembly 102, through the filter(s) 222, and be received by the image sensor 208 for image capturing. In other embodiments, the substrate 234 and the image sensor 208 may be separately attached to the OIS frame or flexure 220. For instance, a first set of one or more electrical traces 216 may be routed between the substrate 234 and the OIS frame or flexure 220. A second, different set of one or more electrical traces 216 may be routed between the image sensor 208 and the OIS frame or flexure 220. In some aspects, an AF coil may be integrated or embedded within the substrate 234.

The actuator assembly 201 may include one or more transversal actuators 203 and one or more axial actuators 205. The one or more transversal actuators 203 may be used for transverse motion (OIS motion) to move the image sensor 208 in one or more directions orthogonal to the optical axis 102*a*. The one or more axial actuators 205 may be used for axial motion (AF motion) to move the image sensor 208 in one or more directions parallel to or along the optical axis 102*a*. Additionally, the one or more axial actuators 205 may be used for angular motion (tilt motion) to tilt the image sensor 208 in about one or more axes orthogonal to the optical axis 102*a*. As described herein, the actuator assembly 201 may integrate the transversal actuator 203 and the axial actuators 205.

In some aspects, the transversal actuators 203 and/or the axial actuators 205 may include voice coil motors (VCM) utilizing Lorenz forces to move the image sensor 208 in one or more directions relative to a stationary structure of the camera 100. For example, the transversal actuators 203 may include one or more transverse motion (OIS motion) VCMs and the axial actuators 205 may include one or more axial motion (AF motion) VCMs. As shown in FIG. 2, the transversal actuators 203 may include OIS coil(s) 217 and magnet(s) 213*a* and the axial actuators 205 may include AF coil(s) 218 and magnet(s) 213*b*. The AF coil(s) 218 may be retained by an AF carrier 218 and the magnet(s) 213*a* may be retained by the magnet holder 206.

The actuator assembly 201 may integrate the transversal actuators 203 and the axial actuators 205. For example, at least a portion of the transversal actuators 203 and at least a portion of the axial actuators 205 may integrated together via the carrier 228. As shown in FIG. 2, both the magnets 213*b* of the axial actuator 205 and the OIS coil(s) 217 of the transversal actuator 203 may be retained by the carrier 228 thereby integrating at least a portion of the transversal actuators 203 and at least a portion of the axial actuators 205 together. Another portion of the axial actuator 205 may be retained by an AF carrier 226. As shown in FIG. 2, the AF coil(s) 218, retained by the AF carrier 226, may be fixedly coupled to the image sensor 208 via the substrate, and may interact with the magnet(s) 213*b* of the axial actuator 205 retained by the carrier 228 to move the image sensor 208 in a direction parallel to the optical axis 102*a*. Another portion of the transversal actuator 203 may be retained by a holder 206. As shown in FIG. 2, the magnet(s) 213*a* of the transversal actuator 203 may be retained by the holder 206 fixedly attached to a shield can 110 of the camera 100 (e.g., a stationary structure of the camera 100), and may interact with the OIS coil(s) 217 of the transversal actuator 203 to move the image sensor 208 in a direction orthogonal to the optical axis 102a.

The carrier 228 may not be fixedly attached to the AF carrier 226 and instead may be coupled to the AF carrier 226 via one or more damping structures providing at least some independent movement between the carrier 228 and the AF carrier 226. For example, top suspension springs 232 and bottom suspension springs 236 may couple the carrier 228 to the AF carrier 226. The top suspension springs 232 and the bottom suspension springs 236 may permit the carrier 228 to move with movement of the image sensor 208 during transversal movement (e.g., OIS movement) of the image sensor 208 while allowing the carrier 208 to remain static (e.g., reduce a bending moment on the carrier 208) during axial movement (e.g., AF movement) of the image sensor 208 and/or during a tilt movement (e.g., angular movement) of the image sensor 208. In some aspects, the bottom suspension springs 236 may be used to route signals from a driver (e.g., a Lorenz driver) mounted on the substrate 234 and through the carrier 228 for reception by the axial actuators 205 and the transversal actuators 203. In some aspects, the carrier 208 may be coupled to the holder 206 via one or more suspension structures 230. The suspension structures 230 (e.g., suspension wires) may couple the carrier 228 to the holder 206 (and thus a stationary structure of the camera) and may permit the carrier 228 to move with movement of the image sensor 208 during transversal movement of the image sensor 208 while preventing the carrier 208 from axial movement during axial movement of the image sensor 208 and/or during a tilt movement of the image sensor 208. Thus, the carrier 228 moves with the image sensor 208 in one or more directions orthogonal to the optical axis 102a (e.g., during OIS or transversal movement of the image sensor 208) and is static relative to the motion of the image sensor 208 in one or more directions parallel to the optical axis 102a (e.g., during AF movement of the image sensor 208 and/or tilt movement of the image sensor 208).

Figure 3:
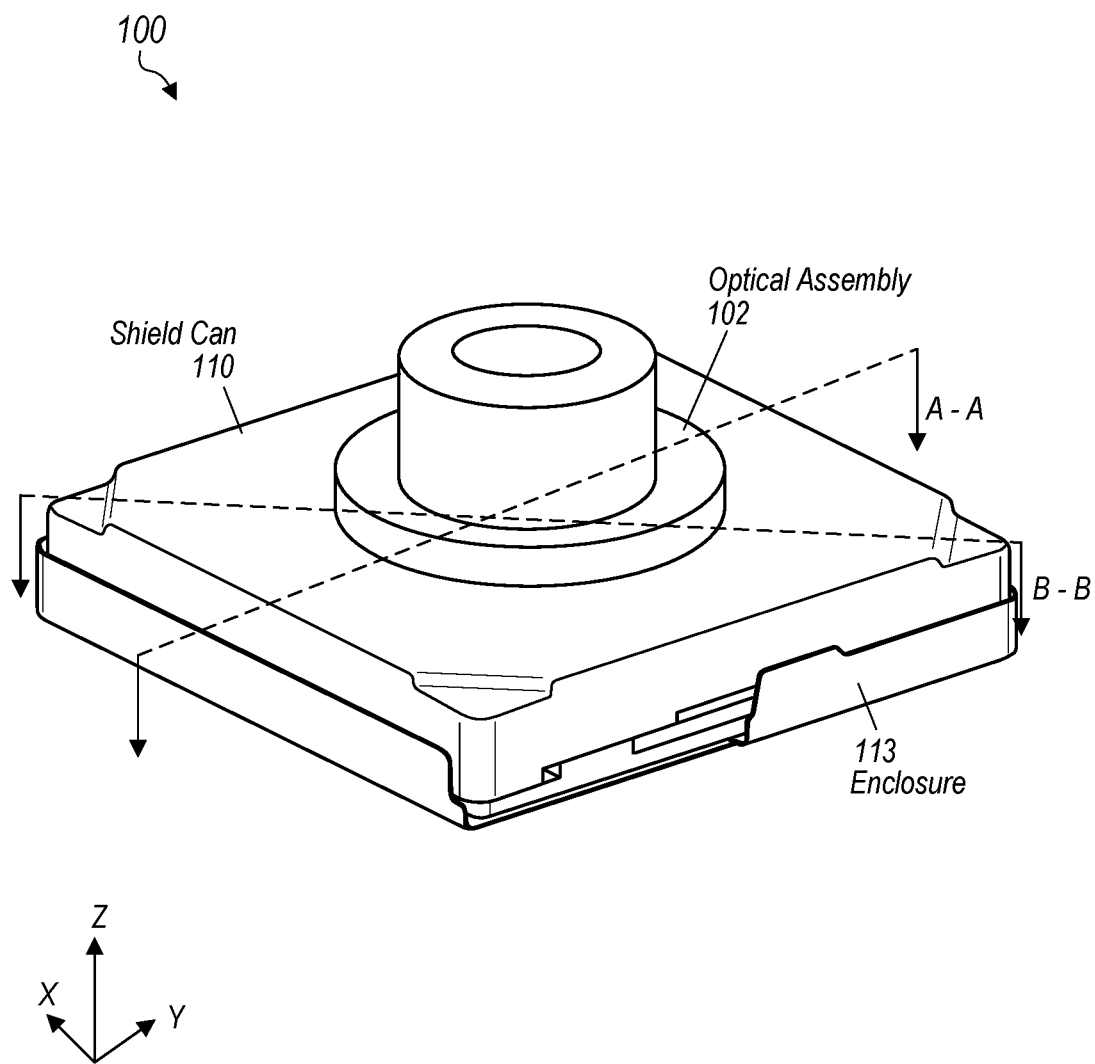
FIGS. 3, 4, and 5 illustrate components of an example camera having an actuator module or assembly that may, for example, be used to provide autofocus and/or optical image stabilization through image sensor movement in small form factor cameras, according to at least some embodiments.
Figure 4:
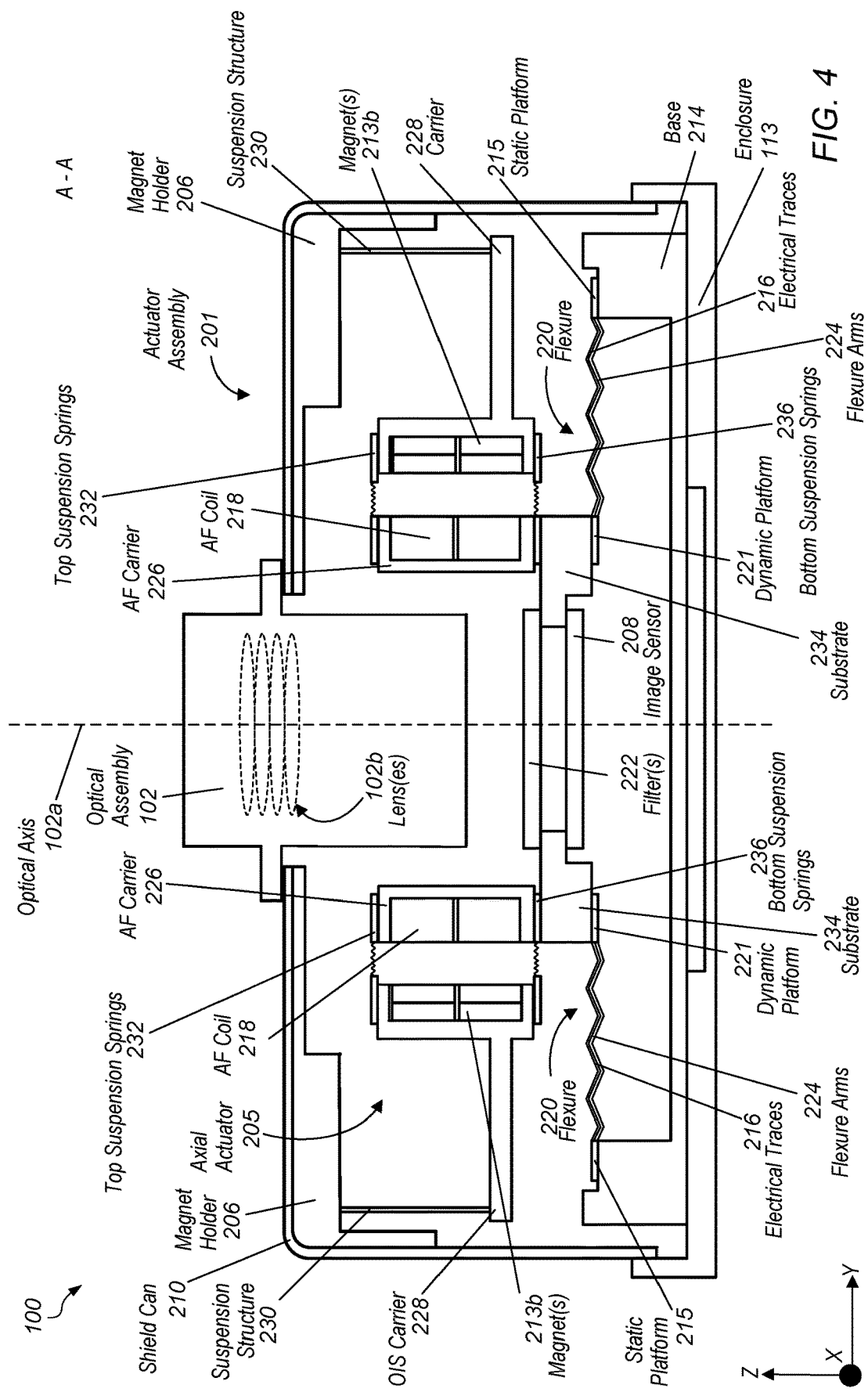
Figure 5:
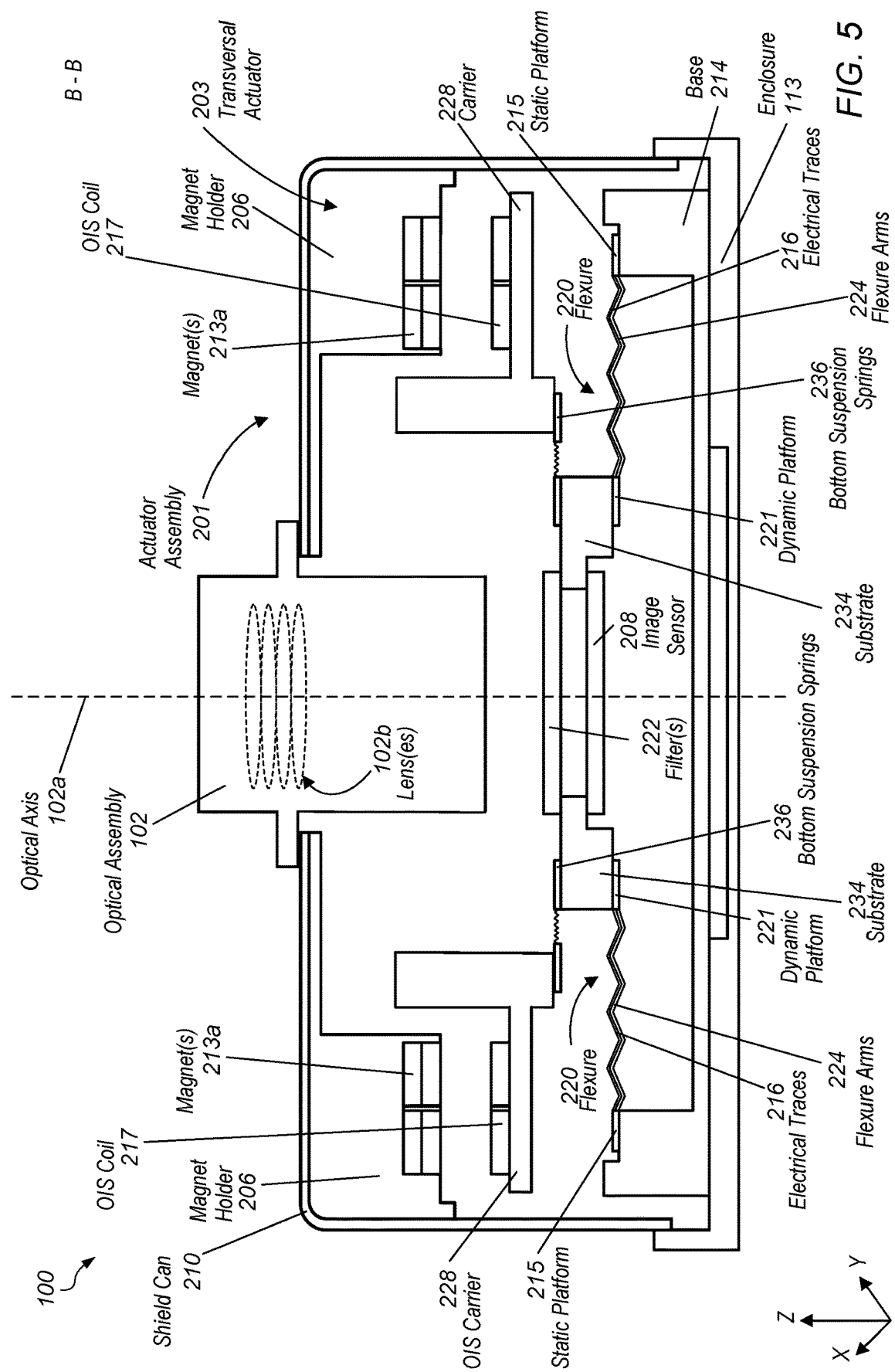

FIGS. 3, 4, and 5 illustrate components of an example camera having an actuator module or assembly that may, for example, be used to provide autofocus and/or optical image stabilization through image sensor movement in small form factor cameras, according to at least some embodiments. FIG. 3 shows an overhead perspective view of the exterior of the camera. FIG. 4 shows a cross-sectional view of the camera across the A-A plane. FIG. 5 shows a cross-sectional view of the camera across the B-B plane. The camera 100 may include one or more same or similar features as the features described with respect to or illustrated in FIGS. 1, 2, 6, 7, 8, 9, 10, 11, 12, 13A, 13B, 13C, 14, and 15. The example X-Y-Z coordinate system shown in FIGS. 3, 4, and 5 is used to discuss aspects of components and/or systems, and may apply to embodiments described throughout this disclosure.

In various embodiments, the camera 100 may include an optical assembly 102 having one or more lenses 102b defining an optical axis 102a, a flexure 220, an actuator assembly 201, a shield can 110, a substrate 234 (e.g., an OIS FPC, printed circuit board, and/or the like), filter(s) 222, an image sensor 208, a base 114, and an enclosure 113. The flexure 220 may be connected to a bottom surface of the base 114. In some examples, the base 114 may define one or more recesses and/or openings having multiple different cross-sections. For instance, a lower portion of the base 114 and/or an upper portion of the base 114 may define a recess and/or an opening with a cross-section sized to receive the flexure 220. The shield can 110 may be mechanically attached to the base 114. The shield can 110 may be mechanically coupled to the base 114 via the enclosure 113 attached to both the shield can 110 and the base 114.

The flexure 220 may include a dynamic platform 221, a static platform 215, and a plurality of flexure arms 224. The plurality of flexure arms 224 may provide a flexible mechanical coupling between the static platform 215 and the dynamic platform 221. For example, the flexure arms 224 may allow the dynamic platform 221 to move in one or more directions orthogonal to the optical axis 102a relative to the static platform 215 (e.g., a remainder of the camera 100) using one or more transversal actuators 203 and may allow the dynamic platform 221 to move in one or more directions parallel to or along the optical axis 102a relative to the static platform 215 (e.g., a remainder of the camera 100) using one or more axial actuators 205. Additionally, the flexure arms 224 may allow the dynamic platform 221 to move in one or more angular directions about one or more axes orthogonal to the optical axis 102a relative to the static platform 215 (e.g., a remainder of the camera 100) using one or more axial actuators 205. In some aspects, the flexure arms 224 may include electrical traces 216 for communicating electrical power and electrical signals between the dynamic platform 221 (e.g., one or more electronic components (e.g., electronic components 239) mounted on the substrate 234, the image sensor 208 mounted on the substrate 234, one or more electronic components mounted to the dynamic platform 221, or the like) and the static platform 215. The static platform 215 may be in electrical communication with one or more other components of the camera 100, via an electrical connection, for performing one or more camera operations.

In some non-limiting examples, the image sensor 208 may be attached to or otherwise integrated into the substrate 234, such that the image sensor 208 is connected to the OIS frame or flexure 220 via the substrate 234. For example, the dynamic platform 221 may retain the substrate 234 for mounting one or more electronic components 239 and/or the image sensor 208. The substrate 234 may include an opening with a cross-section sized to permit light to pass therethrough while also receiving or retaining the filter(s) 222 and the image sensor 208. An upper surface of a top layer of the substrate 234 may retain the filter(s) 222 around a perimeter of the opening and a lower surface of a lower layer of the substrate 234 may retain the image sensor 208 around the perimeter of the opening. In some aspects, a ceramic layer beneath the lower layer of the substrate 234 may couple the image sensor 208 to the substrate 234. In some aspects, the lower layer of the substrate 234 may include a ceramic material that may couple the image sensor 208 to the substrate 234. With the lower surface of the lower layer of the substrate 234 retaining the image sensor 208 around the perimeter of the opening, the image sensor 208 may be connected (e.g., mechanically and/or electrically) to the flexure 220 via the substrate 234. This configuration may allow the substrate 234 to retain the image sensor 208 (and the filter(s) 222) while also allowing light to pass from the lens(es) of the optics assembly 102, through the filter(s) 222, and be received by the image sensor 208 for image capturing. In other embodiments, the substrate 234 and the image sensor 208 may be separately attached to the OIS frame or flexure 220. For instance, a first set of one or more electrical traces 216 may be routed between the substrate 234 and the OIS frame or flexure 220. A second, different set of one or more electrical traces 216 may be routed between the image sensor 208 and the OIS frame or flexure 220. In some aspects, an AF coil may be integrated or embedded within the substrate 234.

The actuator assembly 201 may include one or more transversal actuators 203 and one or more axial actuators 205. Axial actuators 205 may be positioned within the camera 100 along the A-A line illustrated in FIG. 3. Also, axial actuators 205 may be positioned within the camera 100 along a line orthogonal to the A-A line illustrated in FIG. 3. As shown in FIG. 4, the one or more axial actuators 205 may be used for axial motion (AF motion) to move the image sensor 208 in one or more directions parallel to or along the optical axis 102a. Additionally, the one or more axial actuators 205 may be used for angular motion (tilt motion) to tilt the image sensor 208 in about one or more axes orthogonal to the optical axis 102a. In some aspects, the axial actuators 205 may include voice coil motors (VCM) utilizing Lorenz forces to move the image sensor 208 in one or more directions relative to a stationary structure of the camera 100. For example, the axial actuators 205 may include one or more axial motion (AF motion) VCMs. As shown in FIG. 4, the axial actuators 205 may include AF coil(s) 218 and magnet(s) 213b. The AF coil(s) 218 may be retained by an AF carrier 218.

As described herein, the actuator assembly 201 may integrate the transversal actuators 203 and the axial actuators 205. For example, at least a portion of the axial actuators 205 may retained by the carrier 228 for integration with the transversal actuators 203. As shown in FIG. 4, the magnets 213b of the axial actuator 205 may be retained by the carrier 228 for integration with at least a portion of the transversal actuators 203 (e.g., the OIS coil(s) 217). Another portion of the axial actuator 205 may be retained by an AF carrier 226. As shown in FIG. 4, the AF coil(s) 218, retained by the AF carrier 226, may be fixedly coupled to the image sensor 208 via the substrate, and may interact with the magnet(s) 213b of the axial actuator 205 retained by the carrier 228 to move the image sensor 208 in a direction parallel to the optical axis 102a.

The carrier 228 may not be fixedly attached to the AF carrier 226 and instead may be coupled to the AF carrier 226 via one or more damping structures providing at least some independent movement between the carrier 228 and the AF carrier 226. For example, top suspension springs 232 and bottom suspension springs 236 may couple the carrier 228 to the AF carrier 226. The top suspension springs 232 and the bottom suspension springs 236 may permit the carrier 228 to move with movement of the image sensor 208 during transversal movement (e.g., OIS movement) of the image sensor 208 while allowing the carrier 208 to remain static (e.g., reduce a bending moment on the carrier 208) during axial movement (e.g., AF movement) of the image sensor 208 and/or during a tilt movement (e.g., angular movement) of the image sensor 208. In some aspects, the carrier 208 may be coupled to the holder 206 via one or more suspension structures 230. In some aspects, the bottom suspension springs 236 may be used to route signals from a driver (e.g., a Lorenz driver) mounted on the substrate 234 and through the carrier 228 for reception by the axial actuators 205 and the transversal actuators 203. The suspension structures 230 (e.g., suspension wires) may couple the carrier 228 to the holder 206 (and thus a stationary structure of the camera) and may permit the carrier 228 to move with movement of the image sensor 208 during transversal movement of the image sensor 208 while preventing the carrier 208 from axial movement during axial movement of the image sensor 208 and/or during a tilt movement of the image sensor 208. Thus, the carrier 228 moves with the image sensor 208 in one or more directions orthogonal to the optical axis 102a (e.g., during OIS or transversal movement of the image sensor 208) and is static relative to the motion of the image sensor 208 in one or more directions parallel to the optical axis 102a (e.g., during AF movement of the image sensor 208 and/or tilt movement of the image sensor 208).

The actuator assembly 201 may include one or more transversal actuators 203 and one or more axial actuators 205. Transversal actuators 203 may be positioned within the camera 100 along the B-B line illustrated in FIG. 3. Also, transversal actuators 203 may be positioned within the camera 100 along a line orthogonal to the B-B line illustrated in FIG. 3. The one or more transversal actuators 203 may be used for transversal motion (OIS motion) to move the image sensor 208 in one or more directions orthogonal to the optical axis 102a. In some aspects, the transversal actuators 203 may include voice coil motors (VCM) utilizing Lorenz forces to move the image sensor 208 in one or more directions relative to a stationary structure of the camera 100. For example, the transversal actuators 203 may include one or more transversal motion (OIS motion) VCMs. As shown in FIG. 5, the transversal actuators 203 may include OIS coil(s) 217 and magnet(s) 213a. The magnet(s) 213a may be retained by the magnet holder 206.

The actuator assembly 201 may integrate the transversal actuators 203 and the axial actuators 205. For example, at least a portion of the transversal actuators 203 may be retained by the carrier 228 for integration with the axial actuators 205. As shown in FIG. 5, the transversal actuator 203 may be retained by the carrier 228 for integration with at least a portion of the axial actuators 205 (e.g., the magnets 213b). Another portion of the transversal actuator 203 may be retained by magnet holder 206. As shown in FIG. 5, the magnet(s) 213a of the transversal actuator 203 may be retained by the holder 206 fixedly attached to a shield can 110 of the camera 100 (e.g., a stationary structure of the camera 100), and may interact with the OIS coil(s) 217 of the transversal actuator 203 to move the image sensor 208 in a direction orthogonal to the optical axis 102a.

Figure 6:
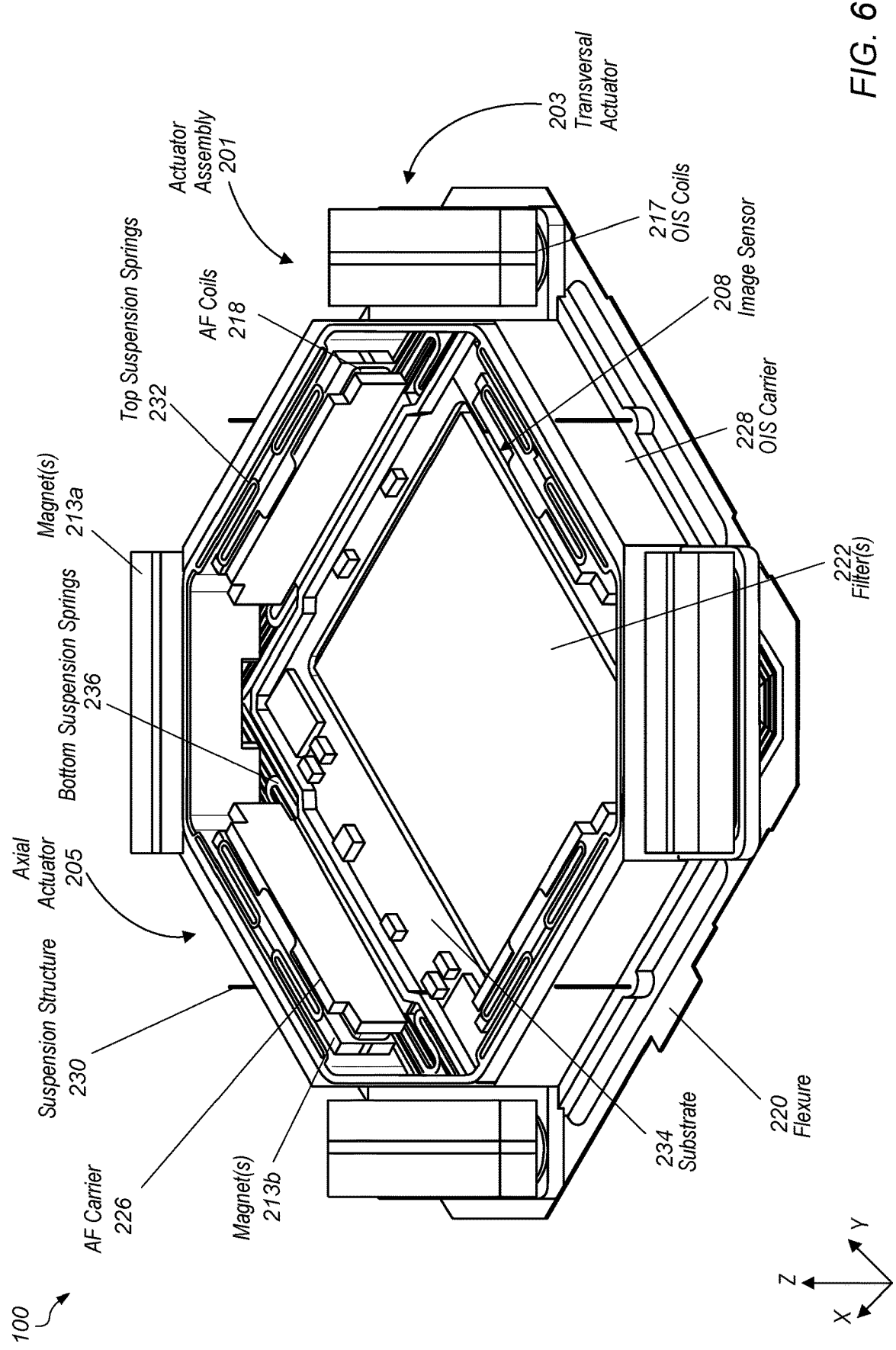
FIG. 6 illustrates an isometric view of an example camera having an actuator module or assembly that may, for example, be used to provide autofocus and/or optical image stabilization through image sensor movement in small form factor cameras, according to at least some embodiments.

FIG. 6 illustrates an isometric view of an example camera 100 having an actuator module or assembly that may, for example, be used to provide autofocus and/or optical image stabilization through image sensor movement in small form factor cameras, according to at least some embodiments. The camera 100 may include one or more same or similar features as the features described with respect to or illustrated in FIGS. 1, 2, 3, 4, 5, 7, 8, 9, 10, 11, 12, 13A, 13B, 13C, 14, and 15. The example X-Y-Z coordinate system shown in FIG. 6 is used to discuss aspects of components and/or systems, and may apply to embodiments described throughout this disclosure.

As described herein, a portion of a first transversal actuator of the plurality of transversal actuators may be retained by the carrier and a portion of a second transversal actuator of the plurality of transversal actuators may also be retained by the carrier. Another portion of the first transversal actuator of the plurality of transversal actuators and another portion of the second transversal actuator of the plurality of transversal actuators may be retained by the holder, fixedly attached to a stationary structure of the camera (e.g., the shield can of the camera), and may interact with the portion of the first transversal actuator and the portion of the second transversal actuator, respectively, to move the image sensor in a direction orthogonal to the optical axis. In some aspects, the plurality of axial actuators and the plurality of transversal actuators may be positioned in an alternating sequence surrounding the image sensor.

As shown in FIG. 6, the plurality of axial actuators 205 may include four axial actuators 205 and the plurality of transversal actuators 203 may include four transversal actuators 203. The four axial actuators 205 and the four transversal actuators 203 may be positioned in an alternating sequence surrounding the image sensor 208 (e.g., positioned below the filter(s) 222) and forming an octagonal shape. Due to the plurality of axial actuators 205 and the plurality of transversal actuators 203, axial movement of the image sensor 208, transversal movement of the image sensor 208, and/or tilt movement of the image sensor 208 may be performed at the sensor level, by individual axial actuators 205 or individual transversal actuators 203, and/or by a combination of one or more axial actuators 205 and/or one or transversal actuators 203. Further the alternating and offsetting positions of the axial actuators 205 and the transversal actuators 203 may minimize or reduce magnetic cross-talk between axial actuator magnets 213$b$ and transversal actuator magnets 213$a$ during transversal movement (e.g., x-direction motion, y-direction motion) of the image sensor 208. The actuator assembly architecture provided herein may allow for independent activation of the AF coils to allow for axial motion and tilt motion (e.g., angular motion) without interference with transversal motion or OIS motion. Transversal motion may shift the entire axial motion actuator structure regardless of which axial actuator of the plurality of axial actuators are activated.

Figure 7:
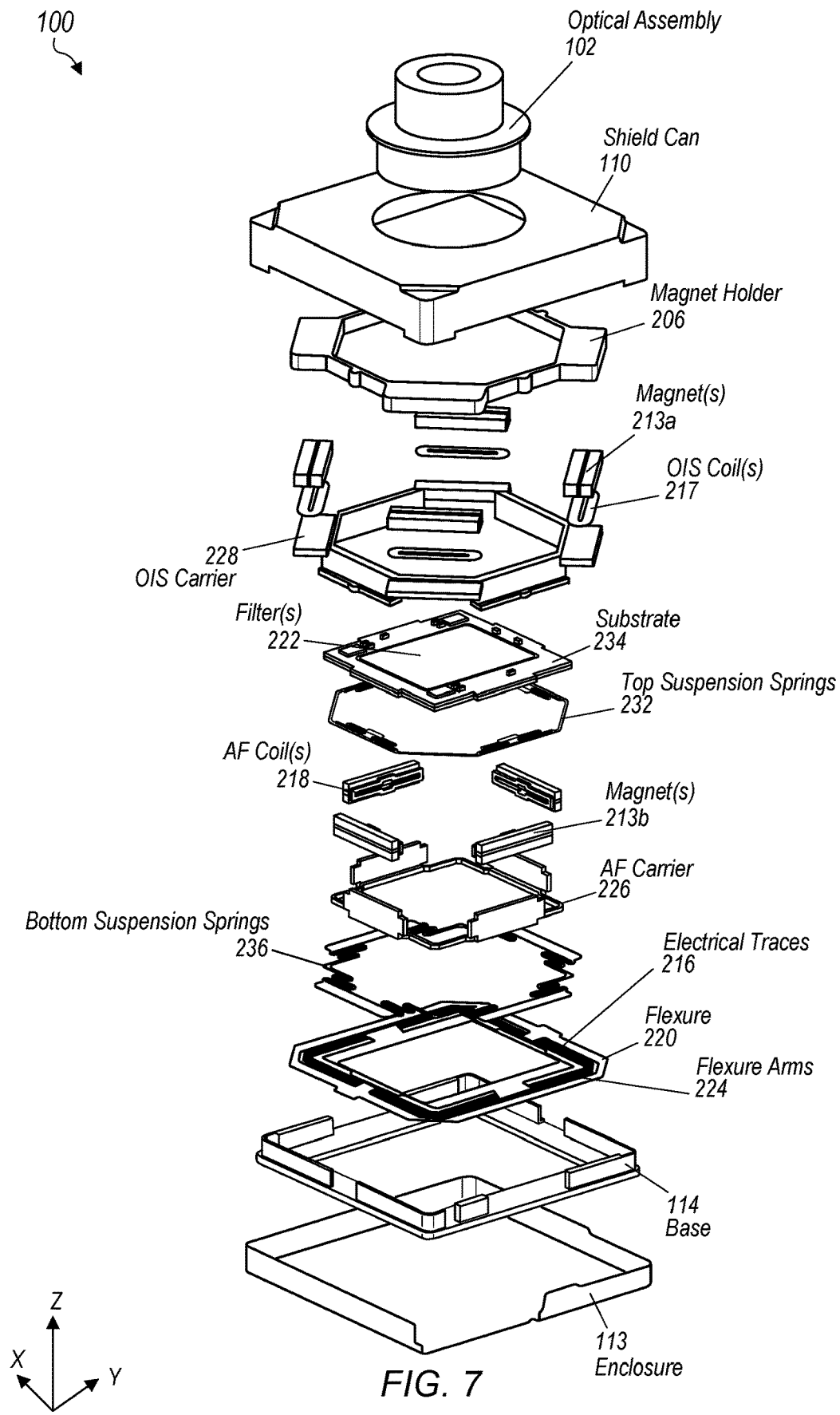
FIG. 7 shows an exploded view of an example camera having an actuator module or assembly that may, for example, be used to provide autofocus through optics assembly movement and/or optical image stabilization through image sensor movement in small form factor cameras, according to at least some embodiments.

FIG. 7 shows an exploded view of an example camera 100 having an actuator module or assembly that may, for example, be used to provide autofocus through optics assembly movement and/or optical image stabilization through image sensor movement in small form factor cameras, according to at least some embodiments. The camera 100 may include one or more same or similar features as the features described with respect to or illustrated in FIGS. 1, 2, 3, 4, 5, 6, 8, 9, 10, 11, 12, 13A, 13B, 13C, 14, and 15. The example X-Y-Z coordinate system shown in FIG. 7 is used to discuss aspects of components and/or systems, and may apply to embodiments described throughout this disclosure.

In various examples, the shield can 110 may be mechanically attached to the base 114. The camera 100 may include an actuator assembly for axial motion, transverse motion, and angular motion. In some cases, the actuator assembly may include the magnet holder 206, the magnet(s) 213$a$ and 213$b$, the OIS coil(s) 217, the AF coil(s) 218, the AF carrier 226, the OIS carrier 228, the top suspension springs 232, the bottom suspension springs 236, the substrate 234, the image sensor 208, the flexure 220, and/or the flexure arms 224. In some examples, the actuator assembly (or a portion thereof) may be connected to the base 114.

In some embodiments, the substrate 234 and/or the flexure 220 may be connected to a bottom surface of the base 114. In some examples, the base 114 may define one or more recesses and/or openings having multiple different cross-sections. For instance, a lower portion of the base 114 may define a recess and/or an opening with a cross-section sized to receive the flexure 220. An upper portion of the base 114 may define a recess and/or an opening with a cross-section sized to receive the substrate 234. The upper portion may have an inner profile corresponding to the outer profile of the substrate 234. This may help to maximize the amount of material included in the base 114 (e.g., for providing structural rigidity to the base 114) while still providing at least a minimum spacing between the substrate 234 and the base 114.

In some non-limiting examples, the substrate 234 and the image sensor 208 may be separately attached to the flexure 220. For instance, a first set of one or more electrical traces 216 may be routed between the substrate 234 and the flexure 220. A second, different set of one or more electrical traces 216 may be routed between the image sensor 208 and the flexure 220. In other embodiments, the image sensor 208 may be attached to or otherwise integrated into the substrate 234, such that the image sensor 208 is connected to the flexure 220 via the substrate 234.

Figure 8:
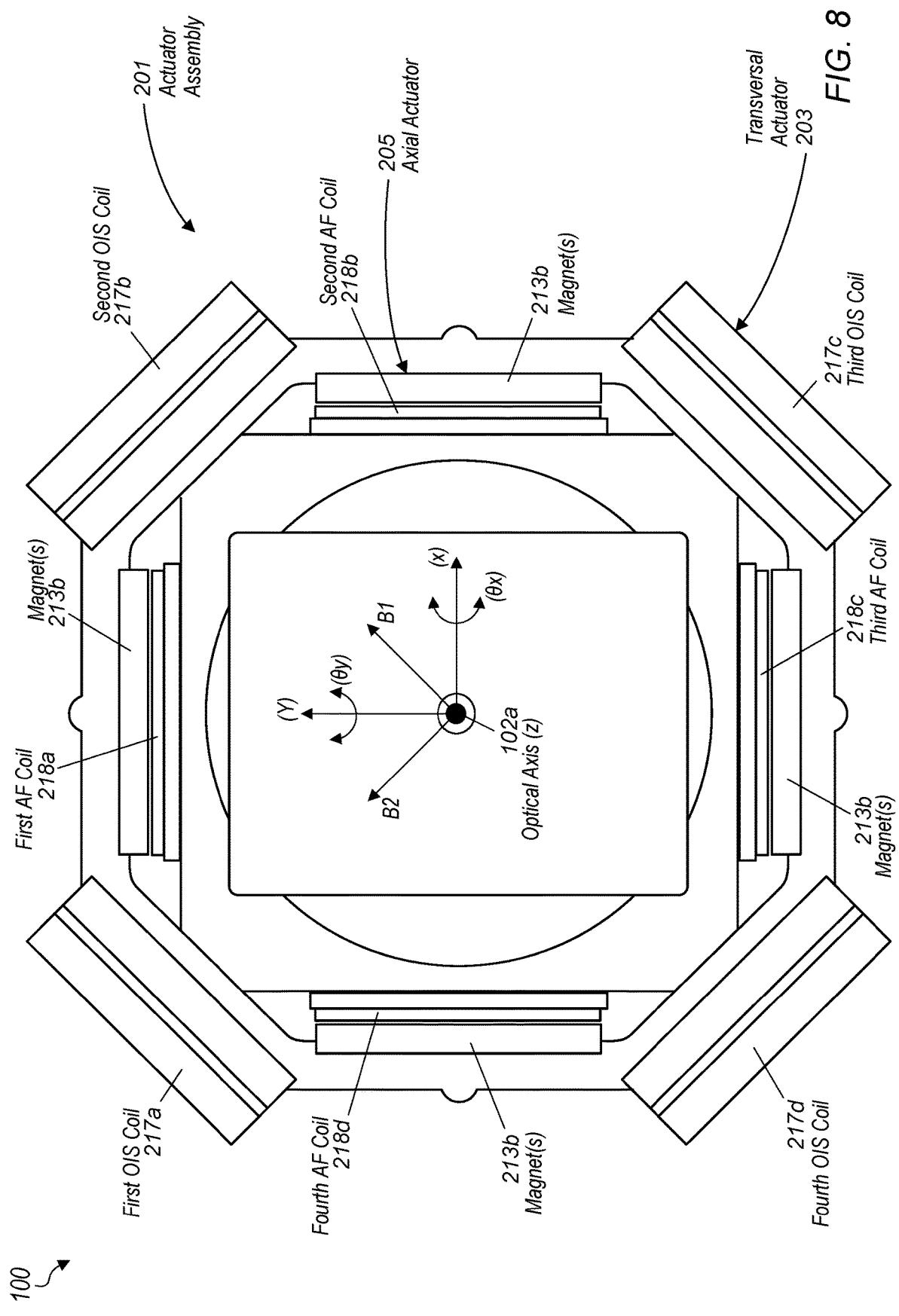
FIG. 8 illustrates an overhead view of an example camera having an actuator module or assembly that may, for example, be used to provide autofocus and/or optical image stabilization through image sensor movement in small form factor cameras, according to at least some embodiments.
Figure 9:
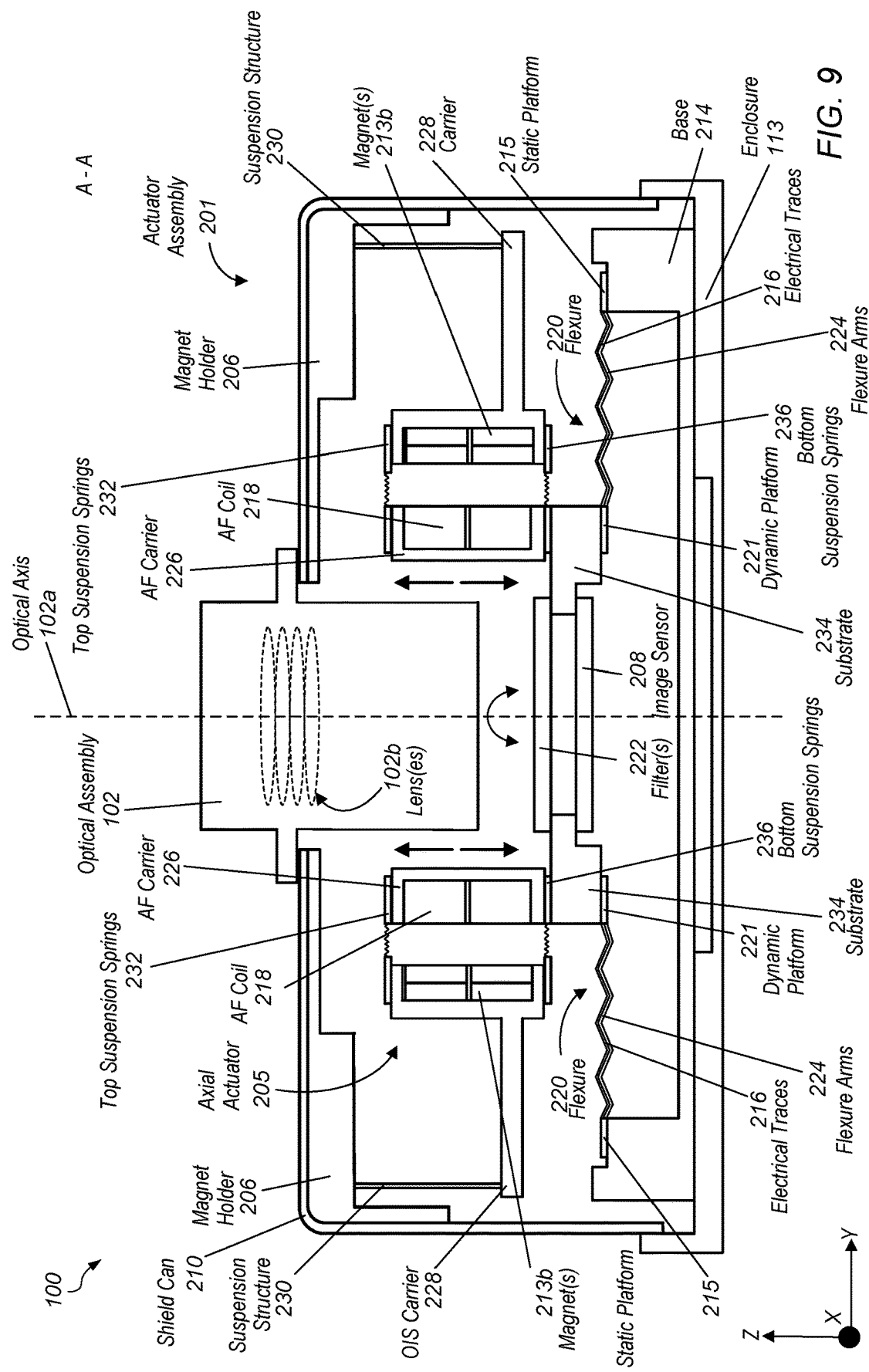
FIGS. 9, 10, and 11 illustrate components of an example camera having an actuator module or assembly that may, for example, be used to provide autofocus and/or optical image stabilization through image sensor movement in small form factor cameras, according to at least some embodiments.
Figure 10:
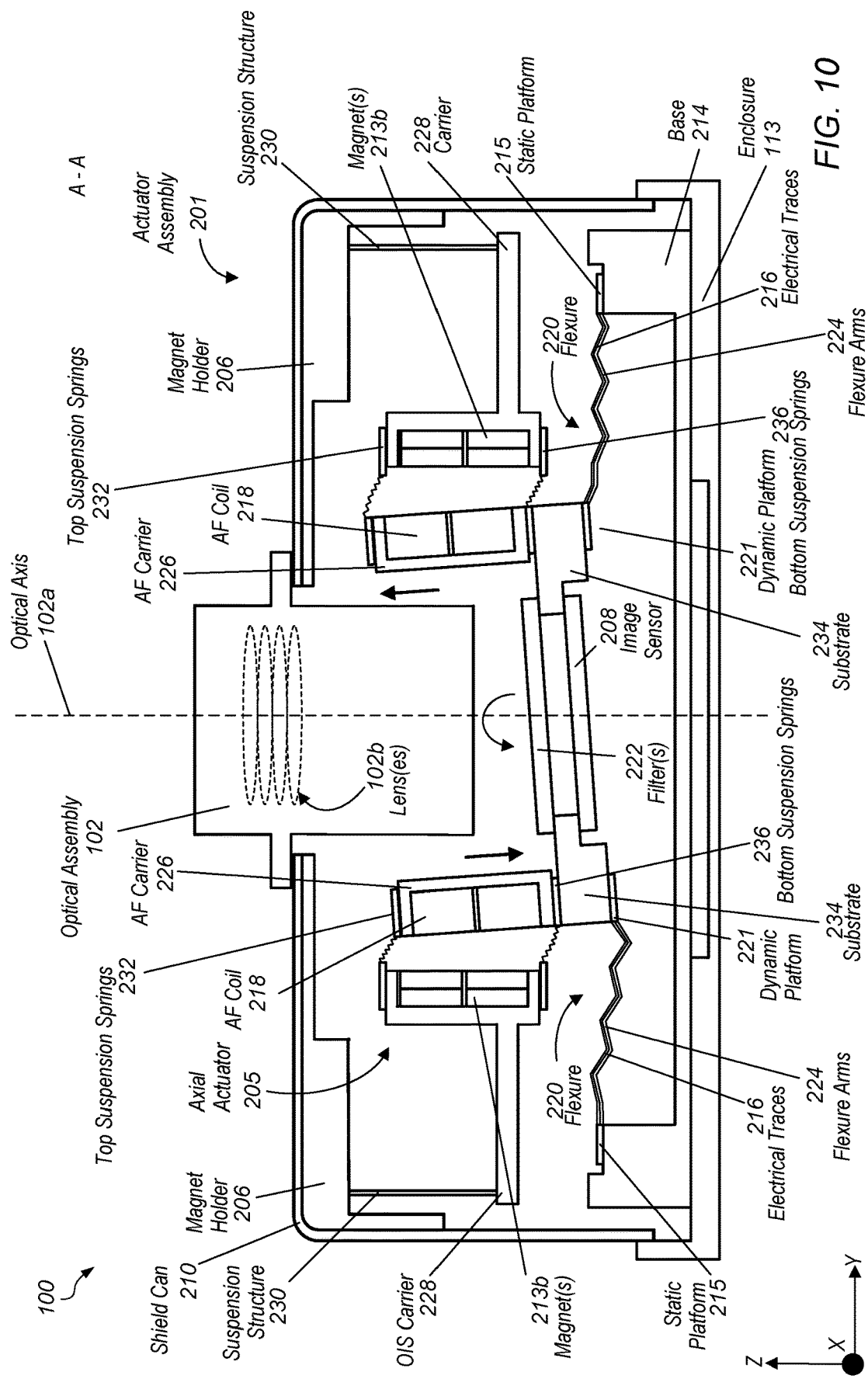
Figure 11:
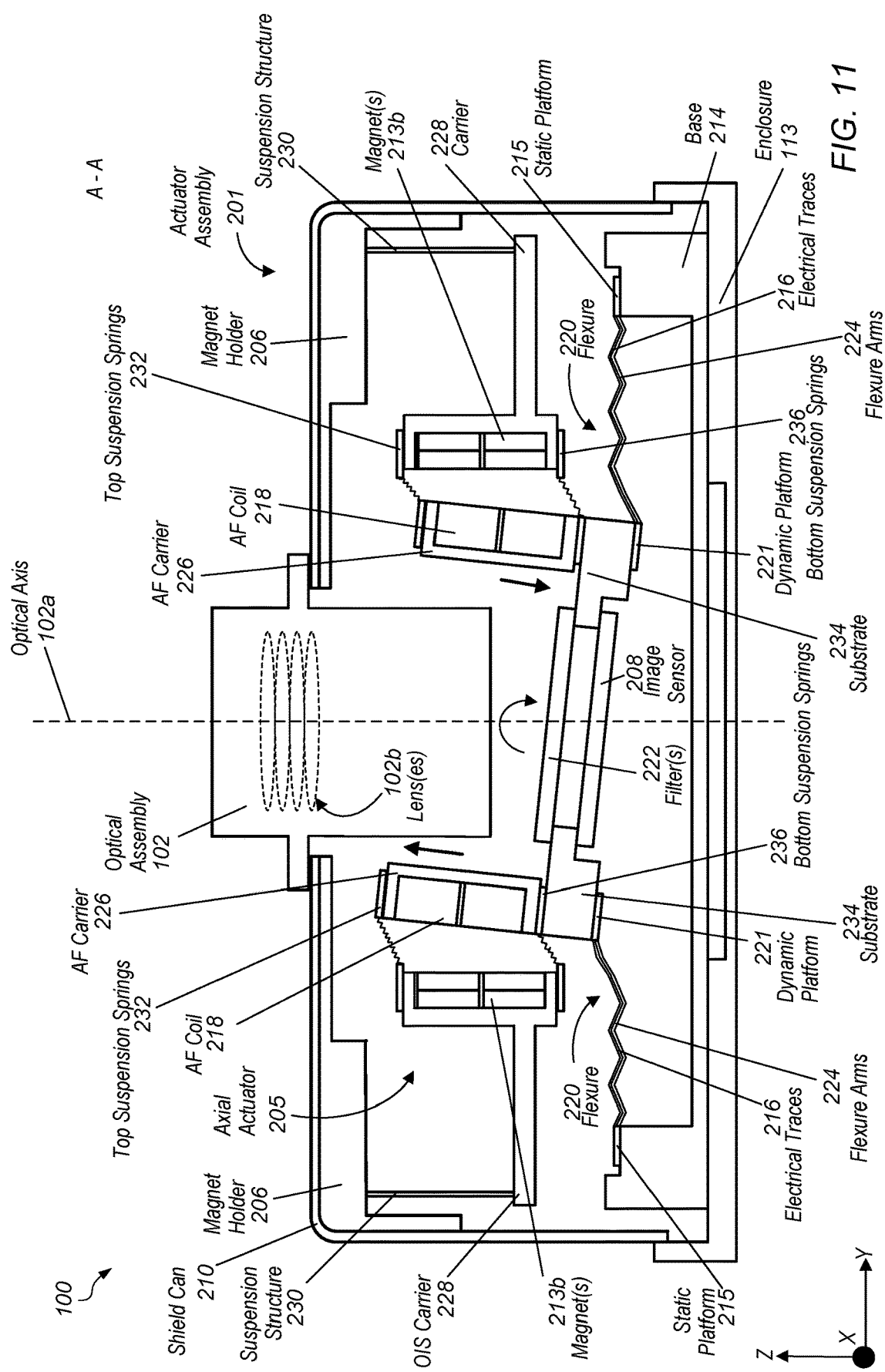

FIG. 8 illustrates an overhead view of an example camera 100 having an actuator module or assembly that may, for example, be used to provide autofocus and/or optical image stabilization through image sensor movement in small form factor cameras, according to at least some embodiments. FIGS. 9, 10, and 11 illustrate components of an example camera having an actuator module or assembly that may, for example, be used to provide autofocus and/or optical image stabilization through image sensor movement in small form factor cameras, according to at least some embodiments. FIG. 9 shows a cross-sectional view of the camera across the A-A plane with no image sensor tilt. FIG. 10 shows a cross-sectional view of the camera across the A-A plane with image sensor tilt in a first direction. FIG. 4 shows a cross-sectional view of the camera across the A-A plane with image sensor tilt in a second direction. The camera 100 may include one or more same or similar features as the features described with respect to or illustrated in FIGS. 1, 2, 3, 4, 5, 6, 7, 12, 13A, 13B, 13C, 14, and 15.

As shown in FIG. 8, the camera 100 may include an actuator assembly 201 may include a plurality of axial actuators 205 and a plurality of transversal actuators 203. The axial actuators 205 and the transversal actuators 203 may be positioned in alternating positions or in an alternating sequence surrounding the optical axial 102$a$ (e.g., surrounding the image sensor 208). The plurality of axial actuators 205 and the plurality of transversal actuators 203 may be used to move the image sensor 208 in as many as five (5) different ranges of motion.

In some aspects, the axial actuators including the magnet(s) 213$b$ and the adjacent first AF coil(s) 218$a$, the magnet(s) 213$b$ and the adjacent second AF coil(s) 218$b$, the magnet(s) 213$b$ and the adjacent third AF coil(s) 218$c$, and/or the magnet(s) 213$b$ and the adjacent fourth AF coil(s) 218$b$ may be used together (or in pairs) to move the image sensor 208 in a direction parallel to the optical axis 102$a$ towards the optical assembly 102 and/or to move the image sensor 208 in a direction parallel to the optical axis 102$a$ away from the optical assembly 102. For example, as shown in FIG. 9, the axial actuators 205 may together drive the image sensor 208 upward in a direction parallel to (e.g., along) the optical axis 102$a$ towards to the optical assembly 102 and may together drive the image sensor 208 downward in a direction parallel to (e.g., along) the optical axis 102$a$ away from to the optical assembly 102.

In some aspects, the transversal actuators including the magnet(s) 213$a$ and the adjacent second OIS coil(s) 217$b$, the magnet(s) 213$a$ and the adjacent fourth AF coil(s) 218$d$ may together be used to move the image sensor 208 along the axis B1 orthogonal to the optical axis 102$a$. Similarly, the transversal actuators including the magnet(s) 213$a$ and the adjacent first OIS coil(s) 217$a$, the magnet(s) 213$a$ and the adjacent third AF coil(s) 218$c$ may together be used to move the image sensor 208 along the axis B2 orthogonal to the optical axis 102$a$. In some aspects, the axial actuators including the magnet(s) 213$b$ and the adjacent first AF coil(s) 218$a$ and the magnets 213B and the adjacent third AF coil(s) 218c may be used to tilt (θx) the image sensor 208 about the x-axis orthogonal to the optical axis 102a. Similarly, the axial actuators including the magnet(s) 213b and the adjacent second AF coil(s) 218b and the magnets 213B and the adjacent fourth AF coil(s) 218d may be used to tilt (θy) the image sensor 208 about the y-axis orthogonal to the optical axis 102a. For example, as shown in FIG. 10, an axial actuator 205 may drive the image sensor 208 in a direction parallel to (e.g., along) the optical axis 102a towards to the optical assembly 102 while another axial actuator 205 may drive the image sensor 208 in a direction parallel to (e.g., along) the optical axis 102a away from the optical assembly 102 causing the image sensor to tilt in a first angled direction. Similarly, as shown in FIG. 11, the axial actuators 205 may reverse directions so that an axial actuator 205 may drive the image sensor 208 in a direction parallel to (e.g., along) the optical axis 102a away from the optical assembly 102 while another axial actuator 205 may drive the image sensor 208 in a direction parallel to (e.g., along) the optical axis 102a towards to the optical assembly 102 causing the image sensor to tilt in a second angled direction.

Figure 12:
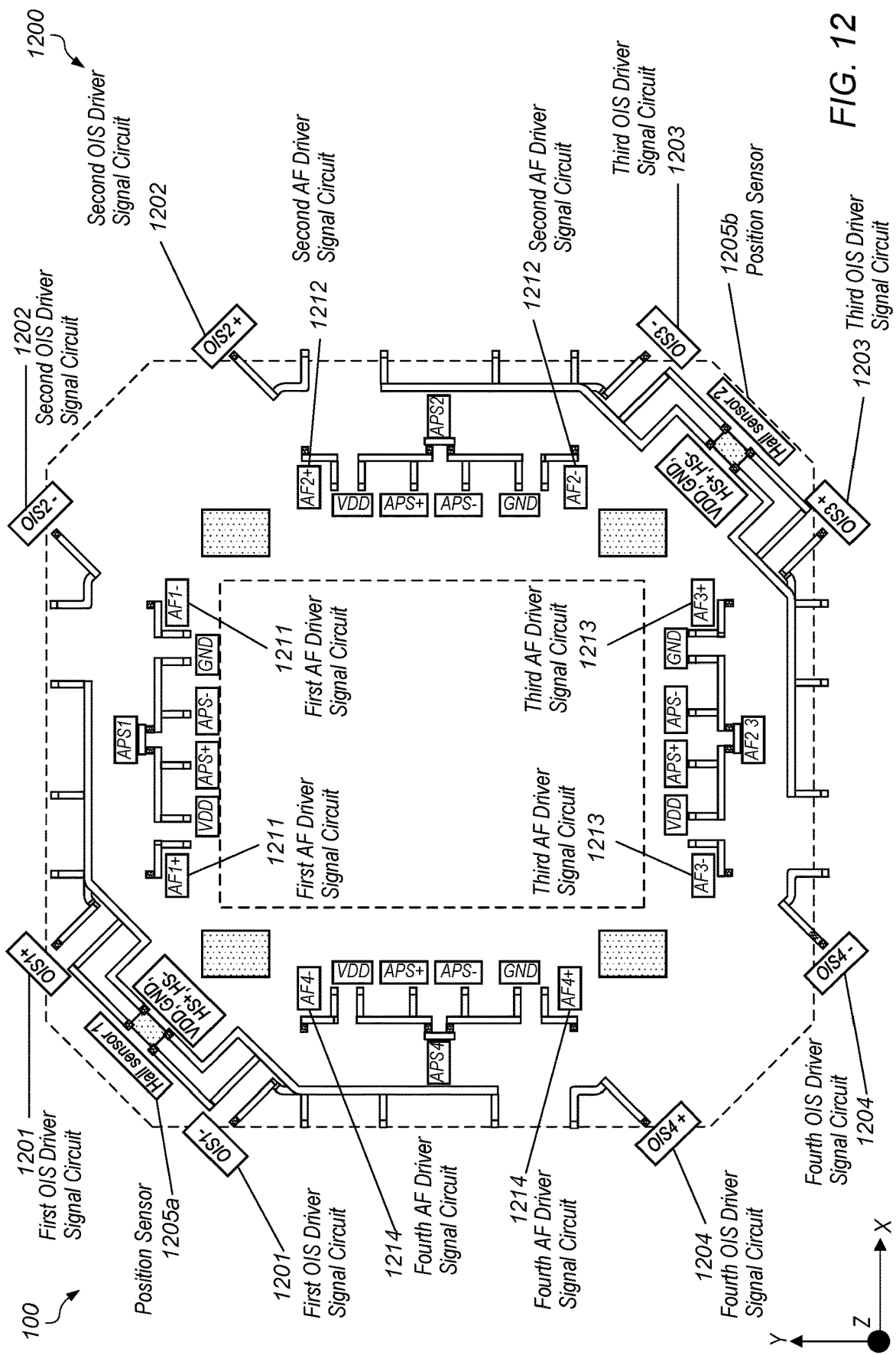
FIG. 12 illustrates an overhead view of an electrical system for an example camera having an actuator module or assembly that may, for example, be used to provide autofocus and/or optical image stabilization through image sensor movement in small form factor cameras, according to at least some embodiments.

FIG. 12 illustrates an overhead view of an electrical system 1200 for an example camera 100 having an actuator module or assembly that may, for example, be used to provide autofocus and/or optical image stabilization through image sensor movement in small form factor cameras, according to at least some embodiments. The camera 100 may include one or more same or similar features as the features described with respect to or illustrated in FIGS. 1, 2, 3, 4, 5, 6, 7, 8, 9, 10, 11, 13A, 13B, 13C, 14, and 15. As shown in FIG. 12, the electrical system 1200 may be configured to provide actuation activation signals to each of the individual axial actuators and transversal actuators independently. For example, a driver (e.g., a Lorenz driver) mounted to the substrate 234 may provide activation signals, via the bottom suspension springs 232 and the carrier 228, to the transversal actuators. For instances, a driver may provide activation signals to a first transversal actuator via the first OIS driver signal circuit 1201, a driver may provide activation signals to a second transversal actuator via the second OIS driver signal circuit 1202, a driver may provide activation signals to a third transversal actuator via the third OIS driver signal circuit 1203, and/or a driver may provide activation signals to a fourth transversal actuator via the fourth OIS driver signal circuit 1204. The OIS driver signal circuits may supply activation signals to the respective transversal actuators by two insert-molded routings inside the carrier 228. In some aspects, two position sensors 1205a and 1205b (e.g., hall sensors) for the x-position and the y-position for the transversal actuators may be included (e.g., embedded) within the carrier 228 and may each utilize four signals (VDD, APS+, APS−, GND) to identify OIS coil positions with respect to the associated magnets 213a.

As another example, a driver (e.g., a Lorenz driver) mounted to the substrate 234 may provide activation signals, via the bottom suspension springs 232, to the axial actuators. For instances, a driver may provide activation signals to a first axial actuator via the first AF driver signal circuit 1211, a driver may provide activation signals to a second axial actuator via the second AF driver signal circuit 1212, a driver may provide activation signals to a third axial actuator via the third AF driver signal circuit 1213, and/or a driver may provide activation signals to a fourth axial actuator via the fourth AF driver signal circuit 1214. The AF driver signal circuits may supply activation signals to the respective axial actuators by two insert-molded routings inside the AF carrier 226. In some aspects, each AF coil 218 may be accompanied by an APS sensor utilizing four signals (VDD, APS+, APS−, GND) to identify AF coil positions with respect to the associated magnets 213b.

Figure 13A:
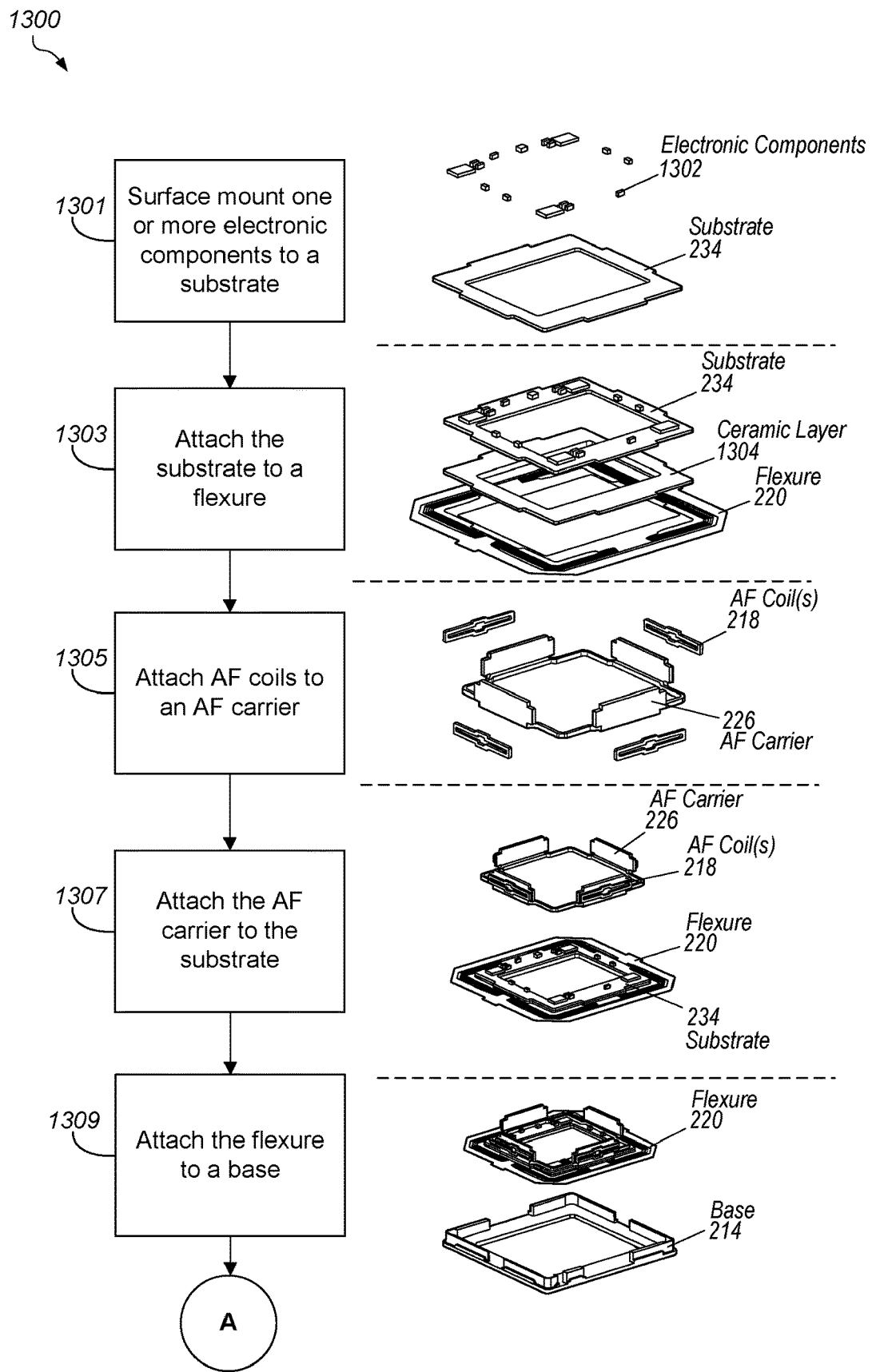
FIG. 13A illustrates steps for a method for assembling a camera having an actuator module or assembly that may, for example, be used to provide autofocus and/or optical image stabilization through image sensor movement in small form factor cameras, according to at least some embodiments.
Figure 13C:
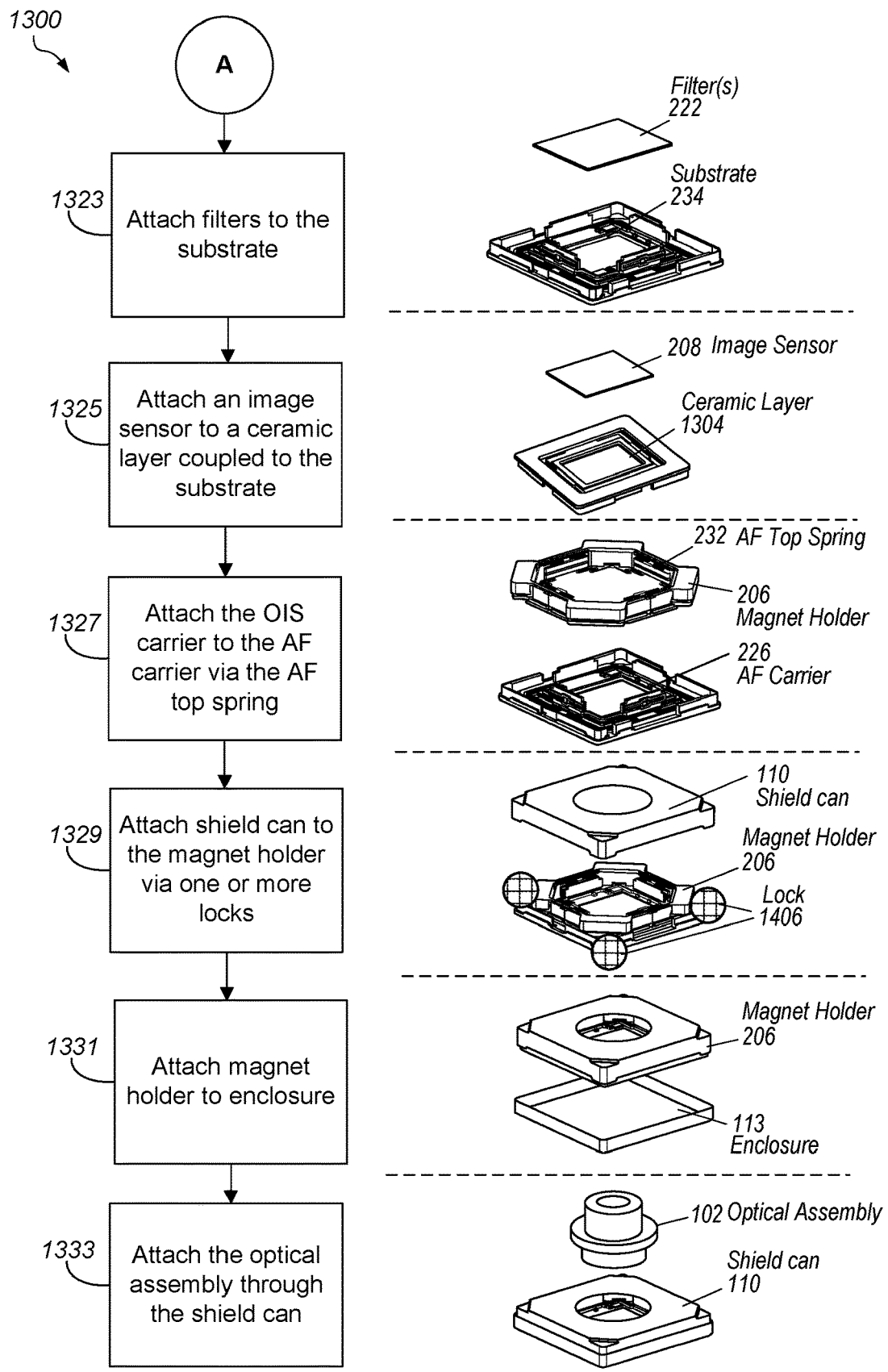
FIG. 13C illustrates steps for a method for assembling a camera having an actuator module or assembly that may, for example, be used to provide autofocus and/or optical image stabilization through image sensor movement in small form factor cameras, according to at least some embodiments.

FIGS. 13A, 13B, and 13C illustrate a method 1300 for assembling a camera 100 having an actuator module or assembly that may, for example, be used to provide autofocus and/or optical image stabilization through image sensor movement in small form factor cameras, according to at least some embodiments. The camera 100 may include one or more same or similar features as the features described with respect to or illustrated in FIGS. 1, 2, 3, 4, 5, 6, 7, 8, 9, 10, 11, 12, 14, and 15. As shown in FIG. 13A, at step 1301, one or more electronic components 1302 may be mounted to the substrate 234. In some aspects, the one or more electronic components 1302 may include one or more drivers to generate activation signals to drive the axial actuators 205 and/or the transversal actuators 203. At step 1303, the substrate 234 may be attached to the flexure 220. In some aspects, a ceramic layer 1304 may mechanically and/or electrically attach the flexure 220 to the substrate 234. At step 1305, the AF coil(s) 218 may be attached to the AF carrier 226. At step 1307, the AF carrier 226 may be attached to the substrate 234. At step 1309, the flexure 220 may be attached to the base 214.

As shown in FIG. 13B, at step 1311, the OIS coil(s) 217 may be attached to the carrier 228. At step 1313, the AF magnet(s) 216b may be attached the carrier 228. At step 1315, the top suspension springs 232 may be attached to the carrier 228. At step 1317, the bottom suspension springs 236 may be attached to the carrier 228. At step 1319, the magnet(s) 216a may be attached to the magnet holder 206. At step 1321, the magnet holder 206 may be attached to the carrier 228 via the suspension structures 230.

As shown in FIG. 13C, at step 1323, the filter(s) 222 may be attached to the substrate 234. At step 1325, the image sensor 208 may be attached to a ceramic layer 1304 coupled to the substrate 234. The ceramic layer 1304 may mechanically and electrically couple the image sensor 208 to the substrate 234. At step 1327, the carrier 228 may be attached to the AF carrier 226 via the top suspension springs 232. At step 1329, the shield can 110 may be attached to the magnet holder 206 via one or more locks. At step 1331, the magnet holder 206 may be attached to the enclosure 113. At step 1333, the optical assembly 102 may be attached to the shield can 110 through a cutout in the shield can 110.

Figure 14:
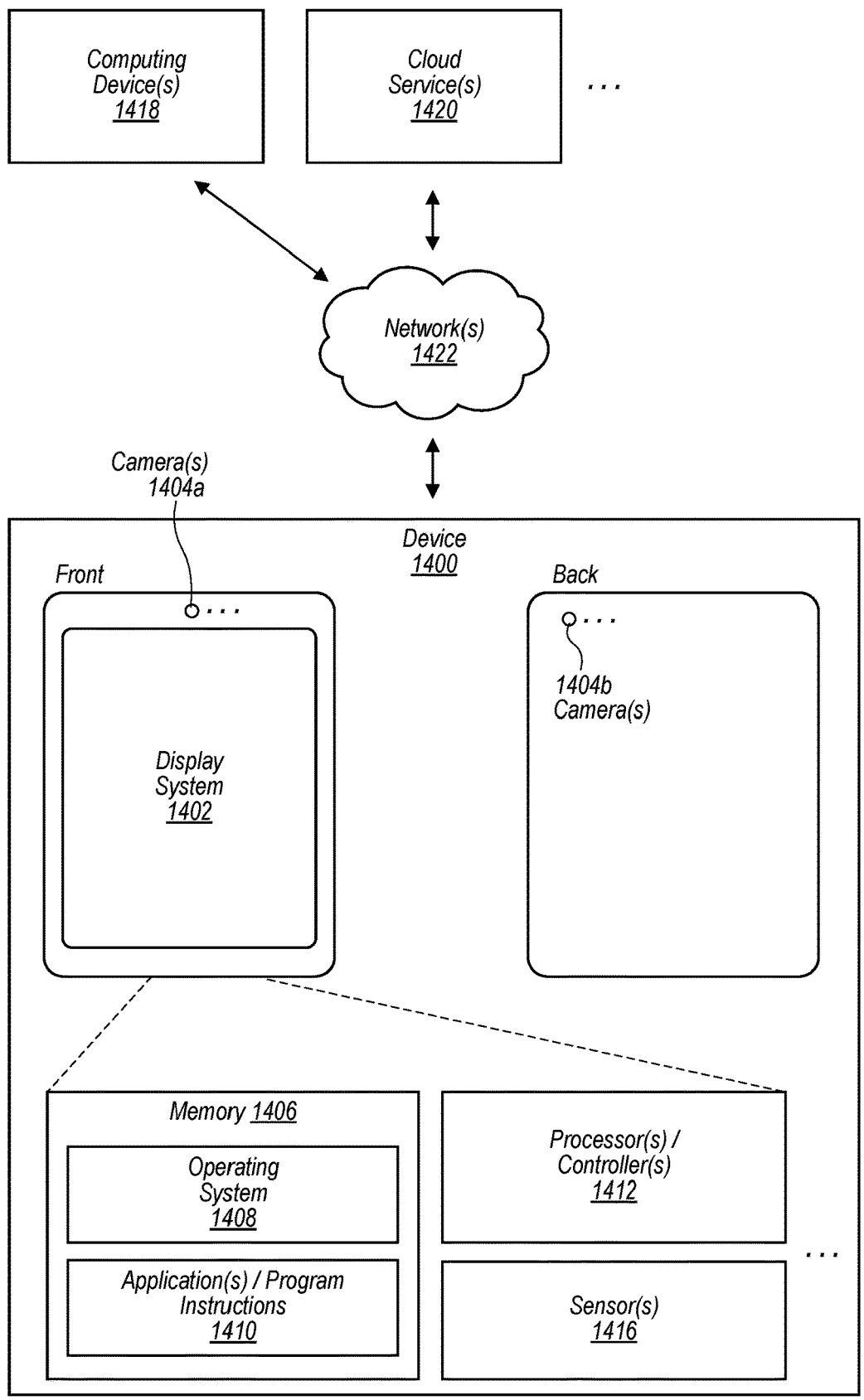
FIG. 14 illustrates a schematic representation of an example device that may include a camera, in accordance with some embodiments.

FIG. 14 illustrates a schematic representation of an example device 1400 that may include a camera (e.g., as described herein with respect to FIGS. 1, 2, 3, 4, 5, 6, 7, 8, 9, 10, 11, 12, 13A, 13B, 13C, and 15), in accordance with some embodiments. In some embodiments, the device 1400 may be a mobile device and/or a multifunction device. In various embodiments, the device 1400 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1400 may include a display system 1402 (e.g., comprising a display and/or a touch-sensitive surface) and/or one or more cameras 1404.

In some non-limiting embodiments, the display system 1402 and/or one or more front-facing cameras 1404a may be provided at a front side of the device 1400, e.g., as indicated in FIG. 14. Additionally, or alternatively, one or more rear-facing cameras 1404b may be provided at a rear side of the device 1400. In some embodiments comprising multiple cameras 1404, some or all of the cameras may be the same as, or similar to, each other. Additionally, or alternatively, some or all of the cameras may be different from each other. In various embodiments, the location(s) and/or arrangement(s) of the camera(s) 1404 may be different than those indicated in FIG. 14.

Among other things, the device 1400 may include memory 1406 (e.g., comprising an operating system 1408 and/or application(s)/program instructions 1410), one or more processors and/or controllers 1412 (e.g., comprising CPU(s), memory controller(s), display controller(s), and/or camera controller(s), etc.), and/or one or more sensors 1416 (e.g., orientation sensor(s), proximity sensor(s), and/or position sensor(s), etc.). In some embodiments, the device 1400 may communicate with one or more other devices and/or services, such as computing device(s) 1418, cloud service(s) 1420, etc., via one or more networks 1422. For example, the device 1400 may include a network interface (e.g., network interface 1410) that enables the device 1400 to transmit data to, and receive data from, the network(s) 1422. Additionally, or alternatively, the device 1400 may be capable of communicating with other devices via wireless communication using any of a variety of communications standards, protocols, and/or technologies.

Figure 15:
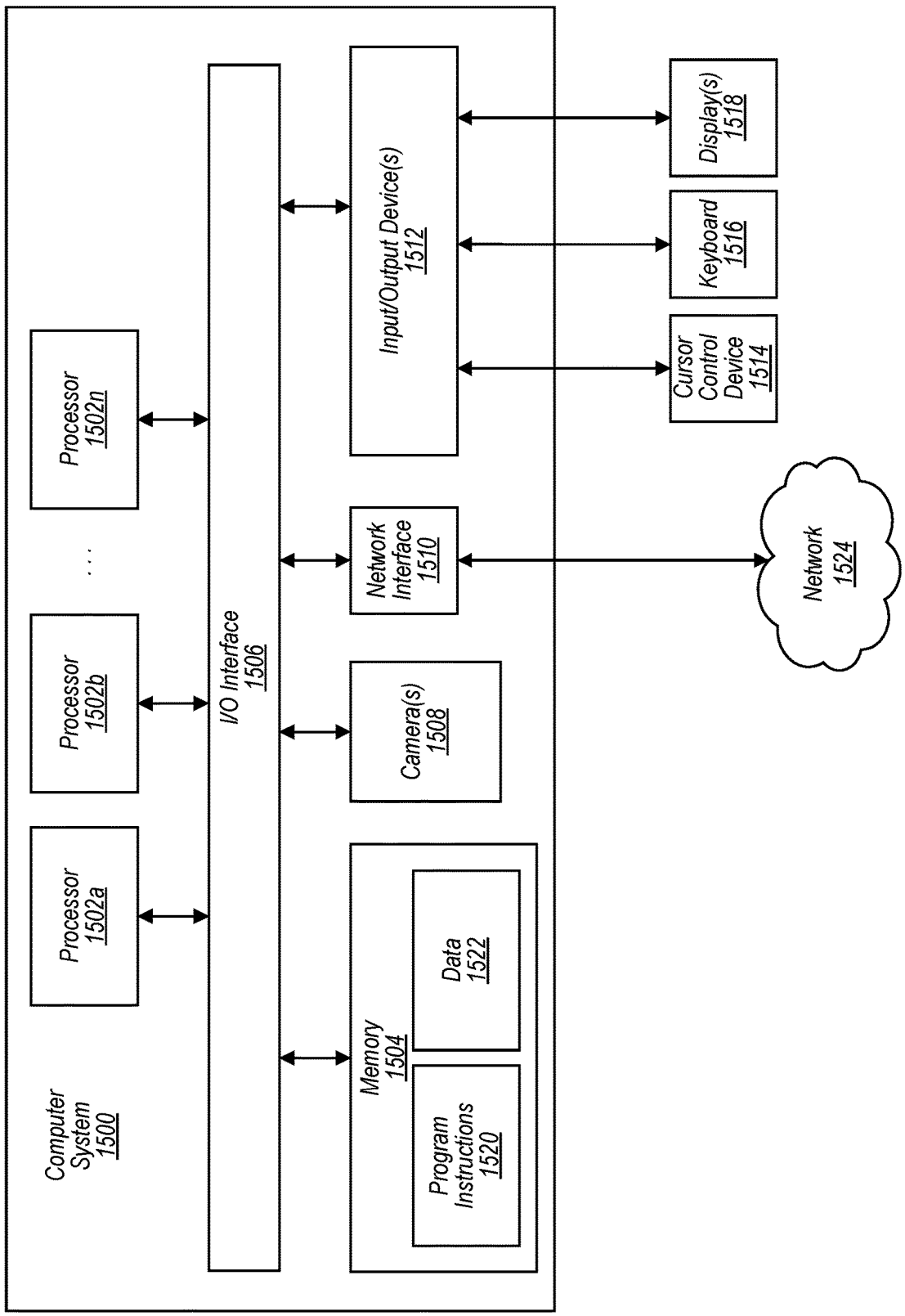
FIG. 15 illustrates a schematic block diagram of an example computing device, referred to as computer system, that may include or host embodiments of a camera, in accordance with some embodiments.

FIG. 15 illustrates a schematic block diagram of an example computing device, referred to as computer system 1500, that may include or host embodiments of a camera (e.g., as described herein with respect to FIGS. 1, 2, 3, 4, 5, 6, 7, 8, 9, 10, 11, 12, 13A, 13B, 13C, and 14). In addition, computer system 1500 may implement methods for controlling operations of the camera and/or for performing image processing images captured with the camera. In some embodiments, the device 1500 (described herein with reference to FIG. 15) may additionally, or alternatively, include some or all of the functional components of the computer system 1400 described herein.

The computer system 1500 may be configured to execute any or all of the embodiments described above. In different embodiments, computer system 1500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1500 includes one or more processors 1502 coupled to a system memory 1504 via an input/output (I/O) interface 1506. Computer system 1500 further includes one or more cameras 1508 coupled to the I/O interface 1506. Computer system 1500 further includes a network interface 1510 coupled to I/O interface 1506, and one or more input/output devices 1512, such as cursor control device 1514, keyboard 1516, and display(s) 1518. In some cases, it is contemplated that embodiments may be implemented using a single instance of computer system 1500, while in other embodiments multiple such systems, or multiple nodes making up computer system 1500, may be configured to host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1502, or a multiprocessor system including several processors 1502 (e.g., two, four, eight, or another suitable number). Processors 1502 may be any suitable processor capable of executing instructions. For example, in various embodiments processors 1502 may be general-purpose or embedded processors implementing any of a variety of instruction set architectures (ISAs), such as the x86, PowerPC, SPARC, or MIPS ISAs, or any other suitable ISA. In multiprocessor systems, each of processors 1502 may commonly, but not necessarily, implement the same ISA.

System memory 1504 may be configured to store program instructions 1520 accessible by processor 1502. In various embodiments, system memory 1504 may be implemented using any suitable memory technology, such as static random access memory (SRAM), synchronous dynamic RAM (SDRAM), nonvolatile/Flash-type memory, or any other type of memory. Additionally, existing camera control data 1522 of memory 1504 may include any of the information or data structures described above. In some embodiments, program instructions 1520 and/or data 1522 may be received, sent or stored upon different types of computer-accessible media or on similar media separate from system memory 1504 or computer system 1500. In various embodiments, some or all of the functionality described herein may be implemented via such a computer system 1500.

In one embodiment, I/O interface 1506 may be configured to coordinate I/O traffic between processor 1502, system memory 1504, and any peripheral devices in the device, including network interface 1510 or other peripheral interfaces, such as input/output devices 1512. In some embodiments, I/O interface 1506 may perform any necessary protocol, timing or other data transformations to convert data signals from one component (e.g., system memory 1504) into a format suitable for use by another component (e.g., processor 1502). In some embodiments, I/O interface 1506 may include support for devices attached through various types of peripheral buses, such as a variant of the Peripheral Component Interconnect (PCI) bus standard or the Universal Serial Bus (USB) standard, for example. In some embodiments, the function of I/O interface 1506 may be split into two or more separate components, such as a north bridge and a south bridge, for example. Also, in some embodiments some or all of the functionality of I/O interface 1506, such as an interface to system memory 1504, may be incorporated directly into processor 1502.

Network interface 1510 may be configured to allow data to be exchanged between computer system 1500 and other devices attached to a network 1524 (e.g., carrier or agent devices) or between nodes of computer system 1500. Network 1524 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1510 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1512 may, in some embodiments, include one or more display terminals, keyboards, keypads, touchpads, scanning devices, voice or optical recognition devices, or any other devices suitable for entering or accessing data by one or more computer systems 1500. Multiple input/output devices 1512 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1510.

Those skilled in the art will appreciate that computer system 1500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   an optical assembly having one or more lens defining an optical axis;
   an image sensor;
   an actuator assembly to move the image sensor relative to the optical assembly; and
   a flexure that suspends the image sensor from a stationary structure of the camera and that allows motion of the image sensor enabled by the actuator assembly;
   wherein the actuator assembly comprises:
     a transversal actuator including a transversal coil and a transversal magnet for motion of the image sensor in one or more directions orthogonal to the optical axis,
     an axial actuator including an axial coil and an axial magnet for motion of the image sensor in one or more directions parallel to the optical axis, and
     a carrier retaining the transversal coil and the axial magnet, wherein the transversal coil and the axial magnet are fixedly attached to the carrier.

2. The camera of claim 1, wherein the carrier moves with the image sensor in the one or more directions orthogonal to the optical axis, and wherein the carrier is static relative to motion of the image sensor in the one or more directions parallel to the optical axis.

3. The camera of claim 1, wherein the optical assembly comprises a static optical assembly.

4. The camera of claim 1, wherein a holder fixedly attached to the stationary structure of the camera retains the transversal magnet, and wherein an AF carrier fixedly coupled for motion with the image sensor retains the axial coil.

5. The camera of claim 1, wherein the axial actuator including the axial coil and the axial magnet are further configured for motion of the image sensor in one or more rotational directions about an axis orthogonal to the optical axis.

6. The camera of claim 1, wherein:
   the actuator assembly comprises:
     a plurality of transversal actuators including respective transversal coils and respective transversal magnets for the motion of the image sensor in the one or more directions orthogonal to the optical axis; and
     a plurality of axial actuators including respective axial coils and respective axial magnets for the motion of the image sensor in the one or more directions parallel to the optical axis, and
   the carrier retains the respective transversal coils of the plurality of respective transversal actuators and the respective axial magnets of the plurality of axial respective actuators, wherein the respective transversal coils and the respective axial magnets are fixedly attached to the carrier.

7. The camera of claim 6, wherein:
a holder fixedly attached to the stationary structure of the camera retains the respective transversal magnets of the plurality of respective transversal actuators; and
an AF carrier fixedly coupled for motion with the image sensor retains the respective axial coils of the plurality of respective axial actuators.

8. The camera of claim 7, wherein the plurality of respective transversal actuators and the plurality of respective axial actuators are configured to move the image sensor in five different ranges of motion.

9. The camera of claim 7, wherein the plurality of respective transversal actuators and the plurality of respective axial actuators are positioned in an alternating sequence surrounding the image sensor.

10. A device, comprising:
one or more processors;
memory storing program instructions executable by the one or more processors to control operation of a camera; and
the camera comprising:
an optical assembly having one or more lenses defining an optical axis;
an image sensor;
an actuator assembly to move the image sensor relative to the optical assembly; and
a flexure that suspends the image sensor from a stationary structure of the camera and that allows motion of the image sensor enabled by the actuator assembly;
wherein the actuator assembly comprises:
a transversal actuator including a transversal coil and a transversal magnet for motion of the image sensor in one or more directions orthogonal to the optical axis,
an axial actuator including an axial coil and an axial magnet for motion of the image sensor in one or more directions parallel to the optical axis, and
a carrier retaining the transversal coil and the axial magnet, wherein the transversal coil and the axial magnet are fixedly attached to the carrier.

11. The device of claim 10, wherein the carrier moves with the image sensor in the one or more directions orthogonal to the optical axis, and wherein the carrier is static relative to motion of the image sensor in the one or more directions parallel to the optical axis.

12. The device of claim 10, wherein:
the actuator assembly comprises:
a plurality of transversal actuators including respective transversal coils and respective transversal magnets for the motion of the image sensor in the one or more directions orthogonal to the optical axis; and
a plurality of axial actuators including respective axial coils and respective axial magnets for the motion of the image sensor in the one or more directions parallel to the optical axis, and
the carrier retains the respective transversal coils of the plurality of respective transversal actuators and the respective axial magnets of the plurality of axial respective actuators, wherein the respective transversal coils and the respective axial magnets are fixedly attached to the carrier.

13. The device of claim 12, wherein:
a holder fixedly attached to the stationary structure of the camera retains the respective transversal magnets of the plurality of respective transversal actuators; and
an AF carrier fixedly coupled for motion with the image sensor retains the respective axial coils of the plurality of respective axial actuators.

14. The device of claim 12, wherein the plurality of respective transversal actuators and the plurality of respective axial actuators are configured to move the image sensor in five different ranges of motion.

15. The device of claim 12, wherein the plurality of respective transversal actuators and the plurality of respective axial actuators are positioned in an alternating sequence surrounding the image sensor.

16. An actuator assembly for a camera module, comprising:
a transversal actuator including a transversal coil and a transversal magnet for motion of the image sensor in one or more directions orthogonal to the optical axis;
an axial actuator including an axial coil and an axial magnet for motion of the image sensor in one or more directions parallel to the optical axis; and
a carrier retaining the transversal coil and the axial magnet, wherein the transversal coil and the axial magnet are fixedly attached to the carrier.

17. The actuator assembly of claim 16, wherein the carrier moves with the image sensor in the one or more directions orthogonal to the optical axis of the camera module, and wherein the carrier is static relative to motion of the image sensor in the one or more directions parallel to the optical axis of the camera module.

18. The actuator assembly of claim 16, wherein a holder fixedly attached to the stationary structure of the camera retains the transversal magnet, and wherein an AF carrier fixedly coupled for motion with the image sensor retains the axial coil.

19. The actuator assembly of claim 16, wherein the axial actuator including the axial coil and the axial magnet are further configured for motion of the image sensor in one or more rotational directions about an axis orthogonal to the optical axis.

20. The actuator assembly of claim 16, wherein:
the actuator assembly comprises:
a plurality of transversal actuators including respective transversal coils and respective transversal magnets for the motion of the image sensor in the one or more directions orthogonal to the optical axis; and
a plurality of axial actuators including respective axial coils and respective axial magnets for the motion of the image sensor in the one or more directions parallel to the optical axis, and
the carrier retains the respective transversal coils of the plurality of respective transversal actuators and the respective axial magnets of the plurality of axial respective actuators, wherein the respective transversal coils and the respective axial magnets are fixedly attached to the carrier.

* * * * *